US012227005B2

(12) United States Patent

Murayama et al.

(10) Patent No.: US 12,227,005 B2

(45) Date of Patent: Feb. 18, 2025

(54) DRIVE WAVEFORM DETERMINATION METHOD, NON-TRANSITORY COMPUTER-READABLE STORAGE MEDIUM STORING A DRIVE WAVEFORM DETERMINATION PROGRAM, LIQUID DISCHARGE APPARATUS, AND DRIVE WAVEFORM DETERMINATION SYSTEM

(71) Applicant: SEIKO EPSON CORPORATION, Tokyo (JP)

(72) Inventors: Toshiro Murayama, Fujimi-machi (JP); Nobuaki Ito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 153 days.

(21) Appl. No.: 17/443,851

(22) Filed: Jul. 28, 2021

(65) Prior Publication Data

US 2022/0032617 A1 Feb. 3, 2022

(30) Foreign Application Priority Data

Jul. 31, 2020 (JP) ................................ 2020-130104

(51) Int. Cl.

*B41J 2/045* (2006.01)
*B41J 2/14* (2006.01)

(52) U.S. Cl.

CPC ....... *B41J 2/04588* (2013.01); *B41J 2/04541* (2013.01); *B41J 2/04581* (2013.01); *B41J 2/14* (2013.01)

(58) Field of Classification Search

CPC .................................................... B41J 2/04588
See application file for complete search history.

(56) References Cited

U.S. PATENT DOCUMENTS

| | | | | |
|---|---|---|---|---|
| 2004/0051817 A1* | 3/2004 | Takahashi | B41J 2/04588 349/1 |
| 2005/0165684 A1* | 7/2005 | Jensen | G06Q 20/425 705/44 |
| 2007/0057979 A1* | 3/2007 | Gardner | B41J 2/04561 347/5 |
| 2007/0153317 A1* | 7/2007 | Klein | G06F 3/1285 358/1.15 |
| 2013/0163830 A1* | 6/2013 | Matsushita | G06V 40/16 382/118 |
| 2013/0256988 A1* | 10/2013 | Takahashi | B41J 13/0009 271/264 |

FOREIGN PATENT DOCUMENTS

| | | | |
|---|---|---|---|
| JP | 2003-226016 A | 8/2003 | |
| JP | 2010-131910 A | 6/2010 | |
| KR | 2011001443 A * | 1/2011 | B41J 2/04593 |

* cited by examiner

*Primary Examiner* — Shelby L Fidler

(74) *Attorney, Agent, or Firm* — WORKMAN NYDEGGER

(57) ABSTRACT

A drive waveform determination method for determining a drive waveform being a waveform of a drive pulse to be applied to a drive element to discharge liquid from a liquid discharge head, the method including: a first step of notifying a user of first information for the user to determine whether to use a first determination method of determining the drive waveform based on a user operation or a second determination method of determining the drive waveform without any user operation; and a second step of determining the drive waveform in accordance with the first determination method or the second determination method determined by the user based on an instruction on the first information.

10 Claims, 26 Drawing Sheets

DRIVE WAVEFORM DETERMINATION METHOD, NON-TRANSITORY COMPUTER-READABLE STORAGE MEDIUM STORING A DRIVE WAVEFORM DETERMINATION PROGRAM, LIQUID DISCHARGE APPARATUS, AND DRIVE WAVEFORM DETERMINATION SYSTEM

The present application is based on, and claims priority from JP Application Serial Number 2020-130104, filed Jul. 31, 2020, the disclosure of which is hereby incorporated by reference herein in its entirety.

BACKGROUND

1. Technical Field

The present disclosure relates to a drive waveform determination method, a non-transitory computer-readable storage medium storing a drive waveform determination program, a liquid discharge apparatus, and a drive waveform determination system.

2. Related Art

In liquid discharge apparatuses, such as ink jet printers, and the like, drive pulses are generally applied to drive elements, such as piezoelectric elements so as to discharge liquid, such as ink, or the like from nozzles. Here, a drive waveform, which is the waveform of a drive pulse, is determined such that the discharge characteristic of ink from a nozzle becomes a desired characteristic.

In the determination method of a drive waveform disclosed in JP-A-2010-131910, ink is discharged from a nozzle by changing the parameters of the waveform of drive pulses in a plurality of ways to measure the discharge characteristics. After that, the drive waveform is determined by setting the parameters of the waveform of drive pulses to be actually applied based on the discharge characteristics.

Here, when a user determines the drive waveform manually, an excessive load is imposed on the user. On the other hand, when the drive waveform is determined automatically, the user load is reduced. However, some users do not like automatic determination of the drive waveform. Accordingly, when the determination of the drive waveform is uniformly performed either manually or automatically, it has adverse effects from the viewpoint of usability.

SUMMARY

According to an aspect of the present disclosure, there is provided a drive waveform determination method for determining a drive waveform being a waveform of a drive pulse to be applied to a drive element to discharge liquid from a liquid discharge head, the method including: a first step of notifying a user of first information for the user to determine whether to use a first determination method of determining the drive waveform based on a user operation or a second determination method of determining the drive waveform without any user operation; and a second step of determining the drive waveform in accordance with the first determination method or the second determination method determined by the user based on an instruction on the first information.

According to another aspect of the present disclosure, there is provided a non-transitory computer-readable storage medium storing a drive waveform determination program, the program causing a computer to perform the drive waveform determination method described above.

According to still another aspect of the present disclosure, there is provided a liquid discharge apparatus including a liquid discharge head including a drive element for discharging liquid and a processing circuit for performing processing for determining a waveform of a drive pulse to be applied to the drive element, the processing circuit configured to perform steps including: a first step of notifying a user of first information for the user to determine whether to use a first determination method of determining the drive waveform based on a user operation or a second determination method of determining the drive waveform without any user operation; and a second step of determining the drive waveform in accordance with the first determination method or the second determination method determined by the user based on an instruction on the first information.

According to still another aspect of the present disclosure, there is provided a drive waveform determination system including a liquid discharge apparatus including a liquid discharge head including a drive element for discharging liquid, and an information processing apparatus including a processing circuit for performing processing to determine a waveform of a drive pulse to be applied to the drive element, the processing circuit configured to perform steps including: a first step of notifying a user of first information for the user to determine whether to use a first determination method of determining the drive waveform based on a user operation or a second determination method of determining the drive waveform without any user operation; and a second step of determining the drive waveform in accordance with the first determination method or the second determination method determined by the user based on an instruction on the first information.

DESCRIPTION OF EXEMPLARY EMBODIMENTS

Figure 1:
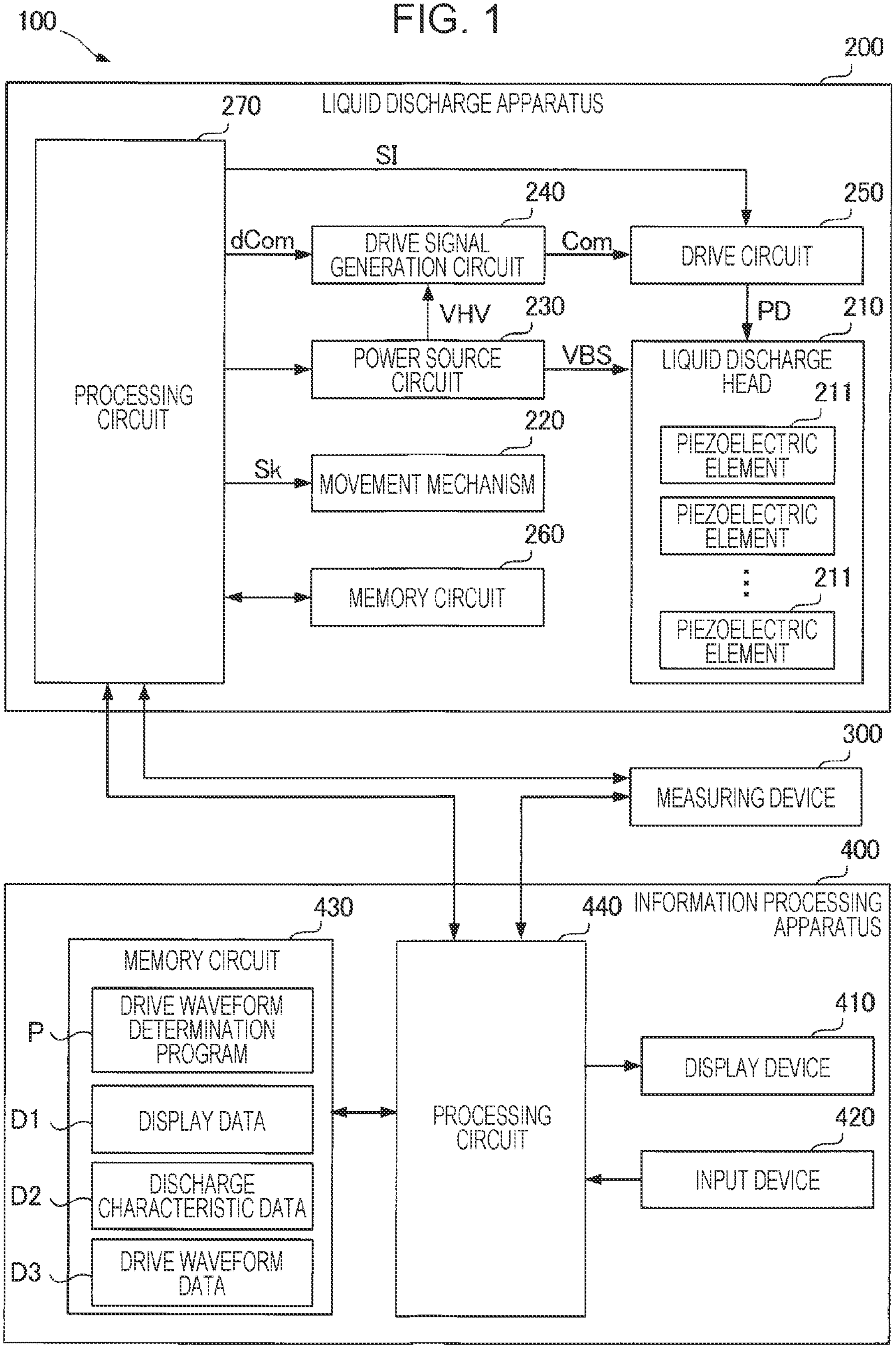
FIG. 1 is a schematic diagram illustrating an example of the configuration of a drive waveform determination system according to a first embodiment.

In the following, a description will be given of preferred embodiments according to the present disclosure with reference to the drawings. In this regard, the size or the scale of each section in the drawings may suitably differ from the actual state, and some parts are schematically illustrated to facilitate understanding. Also, the scope of the present disclosure is not limited to those embodiments unless there is a statement that particularly limits the present disclosure in the following description.

1. First Embodiment

1.1 Outline of Drive Waveform Determination System 100

FIG. 1 is a schematic diagram illustrating an example of the configuration of a drive waveform determination system 100 according to a first embodiment. The drive waveform determination system 100 determines a drive waveform, which is a waveform of a drive pulse PD to be used when ink, an example of liquid, is discharged. The drive waveform determination system 100 performs a drive waveform determination method described later, which enables a user to determine the drive waveform either automatically or manually in accordance with a user request. Accordingly, with the drive waveform determination system 100, it is possible to improve usability.

As illustrated in FIG. 1, the drive waveform determination system 100 includes a liquid discharge apparatus 200, a measuring device 300, and an information processing apparatus 400, which is an example of a computer. The information processing apparatus 400, the liquid discharge apparatus 200, and the measuring device 300 are communicably connected to one another in a wireless or wired manner. In this regard, the connection may be via a communication network including the Internet.

1.1.1 Liquid Discharge Apparatus 200

The liquid discharge apparatus 200 is a printer that prints on a print medium by an ink jet method. The print medium may be a medium on which the liquid discharge apparatus 200 is configured to print. The print medium is not limited in particular, and, for example, is various kinds of paper, various kinds of cloth, various films, or the like. In this regard, the liquid discharge apparatus 200 may be a serial printer or a line printer.

As illustrated in FIG. 1, the liquid discharge apparatus 200 includes a liquid discharge head 210, a movement mechanism 220, a power source circuit 230, a drive signal generation circuit 240, a drive circuit 250, a memory circuit 260, and a processing circuit 270. Also, although not illustrated in FIG. 1, the liquid discharge apparatus 200 includes a communication module that performs a connection to the information processing apparatus 400 and the measuring device 300.

The liquid discharge head 210 discharges ink onto the print medium. In FIG. 1, a plurality of piezoelectric elements 211, which are given as an example of drive elements, are illustrated as the components of the liquid discharge head 210. Although not illustrated in FIG. 1, the liquid discharge head 210 includes pressure chambers that contain ink, nozzles that communicates with the corresponding pressure chambers in addition to the piezoelectric elements 211. Here, the piezoelectric elements 211 are disposed for the corresponding pressure chambers, and thus by changing pressure in a pressure chamber, it is possible to discharge ink from one of the nozzles corresponding to the pressure chamber. In this regard, instead of the piezoelectric elements 211, heaters that heat the ink in the corresponding pressure chambers may be used as drive elements.

In the example in FIG. 1, the number of the liquid discharge heads 210 of the liquid discharge apparatus 200 is one. However, the number may be two or more. In this case, for example, two or more liquid discharge heads 210 are unitized. When the liquid discharge apparatus 200 is a serial type, the liquid discharge head 210 or a unit including two or more liquid discharge heads 210 is used such that a plurality of nozzles are distributed partly in the width direction of the print medium. Also, when the liquid discharge apparatus 200 is a line type, units including two or more liquid discharge heads 210 are used such that a plurality of nozzles are distributed all over in the width direction of the print medium.

The movement mechanism 220 changes the relative position between the liquid discharge head 210 and the print medium. More Specifically, when the liquid discharge apparatus 200 is a serial type, the movement mechanism 220 includes a transport mechanism that transports the print medium in a predetermined direction and a movement mechanism that reciprocally moves the liquid discharge head 210 along the axis perpendicular to the transport direction of the print medium. Also, when the liquid discharge apparatus 200 is a line type, the movement mechanism 220 includes a transport mechanism that transports the print medium in the direction intersecting the longitudinal direction of the unit including two or more liquid discharge heads 210.

The power source circuit 230 receives power from a commercial power source not illustrated in FIG. 1 and generates various predetermined potentials. The generated various potentials are suitably supplied to each section of the liquid discharge apparatus 200. For example, the power source circuit 230 generates a power source potential VHV and an offset potential VBS. The offset potential VBS is supplied to the liquid discharge head 210. Also, the source power potential VHV is supplied to the drive signal generation circuit 240.

The drive signal generation circuit 240 is a circuit that generates a drive signal Com for driving each of the piezoelectric elements 211 of the liquid discharge head 210. Specifically, the drive signal generation circuit 240 includes, for example, a DA conversion circuit and an amplifier circuit. In the drive signal generation circuit 240, the DA conversion circuit converts a waveform specification signal dCom described later output from the processing circuit 270 from a digital signal to an analog signal, and the amplifier circuit amplifies the analog signal so as to generate a drive signal Com by using the power source potential VHV from the power source circuit 230. Here, among the waveforms included in the drive signal Com, the signal having the waveform that is actually supplied to the piezoelectric element 211 is the drive pulse PD. In this regard, a detailed description will be given later of the drive pulse PD.

The drive circuit 250 changes whether or not to supply at least a part of the waveforms included in the drive signal Com as the drive pulse PD for each of the plurality of piezoelectric elements 211 based on a control signal SI described later. The drive circuit 250 is an IC (integrated circuit) chip that outputs the drive signal and a reference voltage for driving each of the piezoelectric elements 211.

The memory circuit 260 stores various programs to be executed by the processing circuit 270 and various kinds of data, such as print data processed by the processing circuit 270, and the like. The memory circuit 260 includes one of or both of semiconductor memories, for example, a volatile memory, such as a RAM (random access memory), and the like, and a nonvolatile memory, such as a ROM (read only memory), an EEPROM (electrically erasable programmable read-only memory), a PROM (programmable ROM), or the like. The print data to be processed by the processing circuit 270 is, for example, supplied from the information processing apparatus 400. In this regard, the memory circuit 260 may be configured as a part of the processing circuit 270.

The processing circuit 270 has a function of controlling each section of the liquid discharge apparatus 200 and a function of processing various kinds of data. The processing circuit 270 includes a processor, for example, one or more CPUs (central processing units), or the like. In this regard, the processing circuit 270 may include a programmable logic device, such as a FPGA (field-programmable gate array), or the like, instead of a CPU or in addition to a CPU.

The processing circuit 270 executes a program stored in the memory circuit 260 so as to control the operation of each section of the liquid discharge apparatus 200. Here, the processing circuit 270 generates signals, such as control signals Sk and SI, a waveform specification signal dCom, and the like as signals for controlling the operation of each section of the liquid discharge apparatus 200.

The control signal Sk is a signal for controlling the drive of the movement mechanism 220. The control signal SI is a signal for controlling the drive circuit 250. Specifically, the control signal SI specifies whether or not the drive circuit 250 supplies the drive signal Com to the liquid discharge head 210 as the drive pulse PD for each predetermined unit period. By this specification, the amount of ink to be discharged from the liquid discharge head 210, and the like are specified. In this regard, the waveform specification signal dCom is a digital signal for specifying the waveform of the drive signal generated by the drive signal generation circuit 240.

1.1.2 Measuring Device 300

The measuring device 300 is a device that measures a discharge result to be used for obtaining the discharge characteristics of ink. As the discharge characteristics, for example, a discharge speed, the amount of ink discharged, the number of satellites, the impact area of ink on a recording medium, and an impact shape are given.

The measuring device 300 according to the present embodiment includes an imaging device that captures an image of the impact state on a print medium of the ink discharged from the liquid discharge head 210. Specifically, the measuring device 300 includes, for example, an imaging optical system and an imaging device. The imaging optical system is an optical system including at least one imaging lens, and may include various optical elements, such as a prism, and like, and may include a zoom lens, a focus lens, or the like. The imaging device is, for example, a CCD (charge coupled device) image sensor, a CMOS (complementary MOS) image sensor, or the like.

The measuring device 300 includes an imaging device so that an impact image of ink on a print medium is obtained as a discharge result. An information processing apparatus 400 described later calculates, for example, an impact area based on the discharge result as the discharge characteristics.

In this regard, in the present embodiment, the measuring device 300 captures the image of the ink impact on the print medium, or the like. However, for example, an image of flying ink may be captured. Also, the measuring device 300 ought to obtain a discharge result to be used to obtain discharge characteristics, and may include a device other than an imaging device. For example, the measuring device 300 may be an electronic balance that measures the amount of ink discharged from the liquid discharge head 210, or the like. Also, the waveform of the residual vibration that occurs in the liquid discharge head 210 may be used as a discharge result.

1.1.3 Information Processing Apparatus 400

The information processing apparatus 400 is a computer that controls the operation of the liquid discharge apparatus 200 and the measuring device 300. Also, the information processing apparatus 400 is a computer that executes a drive waveform determination program P. The drive waveform determination program P causes the information processing apparatus 400 to perform a drive waveform determination method for determining the drive waveform of the drive pulse PD to be applied to the piezoelectric elements 211. In the drive waveform determination method, a user is allowed to select whether to determine the drive waveform manually or automatically. Specifically, the user is permitted to select whether to manually select a state value that represents the state of the drive pulse PD or automatically. The state value is a parameter, such as the amplitude of the drive pulse PD, and the like. In the drive waveform determination method, it is possible for the user to determine whether to determine the drive waveform manually or automatically. Accordingly, it is possible to improve usability compared with the case where the selection is disabled.

As illustrated in FIG. 1, the information processing apparatus 400 includes a display device 410, which is an example of the display section, an input device 420, a memory circuit 430, and a processing circuit 440. These devices are connected with one another via transmission lines and communicable with one another. In this regard, although not illustrated in FIG. 1, the information processing apparatus 400 includes a communication module that connects to the liquid discharge apparatus 200 and the measuring device 300.

The display device 410 is a device that notifies the user of various kinds of information. The display device 410 displays GUI (graphical user interface) including various images under the control of the processing circuit 440. The display device 410 includes various display panels, for example, a liquid crystal display panel, an organic EL (electro-luminescence) display panel, or the like. In this regard, the display device 410 may be disposed outside the information processing apparatus 400. Also, the display device 410 may be a component of the liquid discharge apparatus 200.

Since the information processing apparatus 400 includes the display device 410, it is possible to notify the user of the information by using the images. Accordingly, it is possible for the user to perform the determination processing of the drive waveform while visually recognizing the images. By notifying the user by using the images, it is possible to improve usability compared with, for example, the case of using only sound.

In this regard, the information processing apparatus 400 may include an audio output device, such as a speaker, or the like instead of or in addition to the display device 410. In this case, one of or both of the display device 410 and the audio output device correspond to a device that notifies the user of various kinds of information. Accordingly, various kinds of information is not limited to be notified by display, and may be notified, for example, by sound.

The input device 420 is a device that receives an operation from the user. For example, the input device 420 includes a pointing device, such as a touchpad, a touch panel, a mouse, or the like. Here, when the input device 420 includes a touch panel, the input device 420 may also serve as the display device 410. In this regard, the input device 420 may be disposed outside the information processing apparatus 400. Also, the input device 420 may be a component of the liquid discharge apparatus 200.

The memory circuit 430 is a device that stores various programs that are executed by the processing circuit 440 and various kinds of data processed by the processing circuit 440. The memory circuit 430 includes, for example, a hard disk drive or a semiconductor memory. In this regard, a part of or all of the memory circuit 430 may be disposed in an external storage device or server, or the like of the information processing apparatus 400. In this regard, a part of or all of the various programs and the various kinds of data may be stored in an external storage device, server, or the like of the information processing apparatus 400.

The memory circuit 430 stores the drive waveform determination program P described above. The drive waveform determination program P may be, for example, downloaded in advance or provided from an external device, which is not illustrated in FIG. 1, or the like. Also, the memory circuit 430 stores display data D1 on an image to be display on the display device 410, discharge characteristics data D2 on the discharge characteristics, and drive waveform data D3 on the drive waveform.

The processing circuit 440 is a device having a function of controlling each section of the information processing apparatus 400, the liquid discharge apparatus 200, and the measuring device 300 and a function of processing various kinds of data. The processing circuit 440 includes, for example, a processor, such as a CPU (central processing unit), or the like. In this regard, the processing circuit 440 may be configured by a single processor or by a plurality of processors. Also, a part of or all of the functions of the processing circuit 440 may be realized by hardware, such as a DSP (digital signal processor), an ASIC (application specific integrated circuit), a PLD (programmable logic device), an FPGA (field programmable gate array), or the like.

Figure 2:
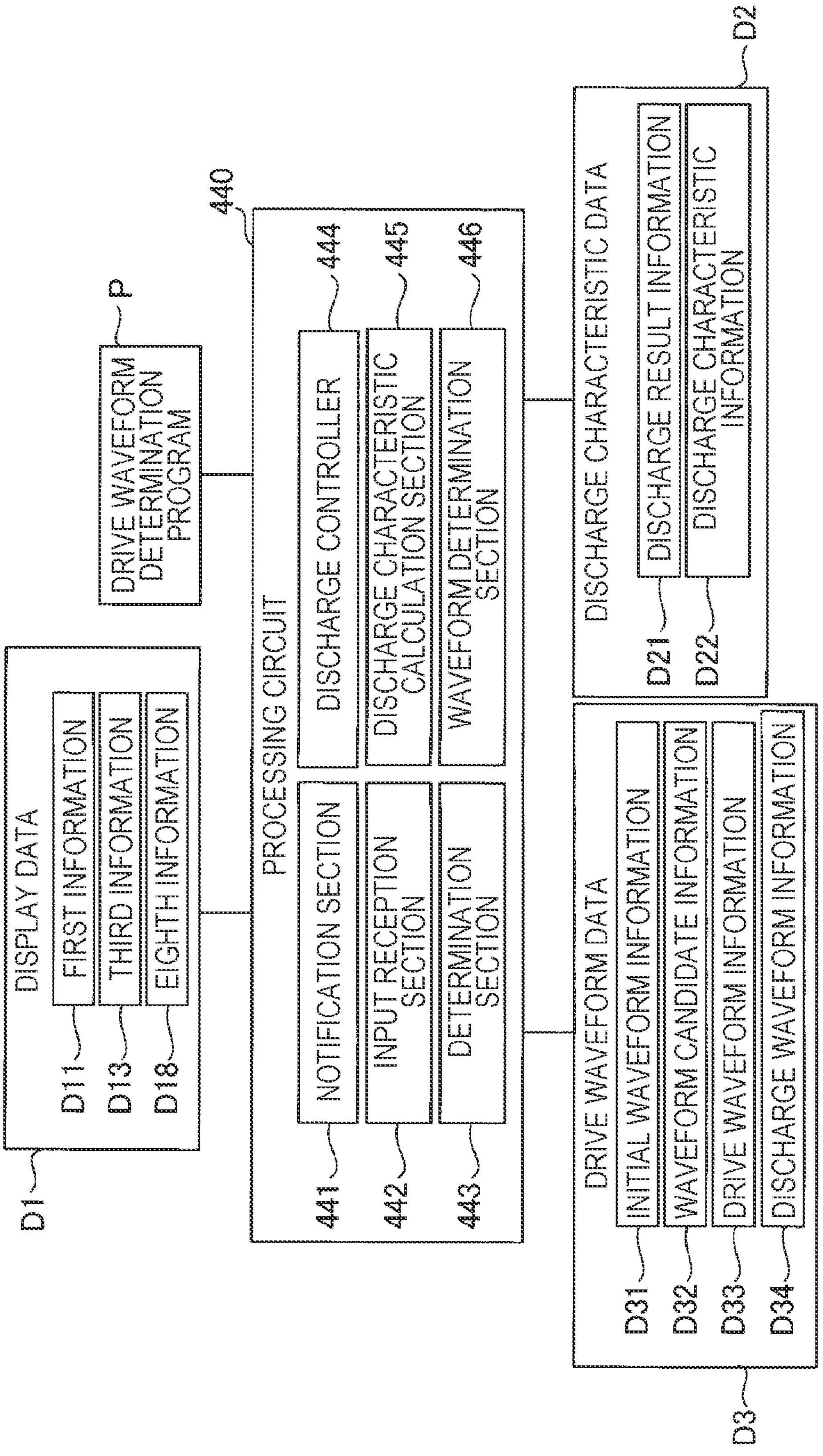
FIG. 2 is a diagram illustrating an example of the functional configuration of an information processing apparatus illustrated in FIG. 1.

FIG. 2 is a diagram illustrating an example of the functional configuration of the information processing apparatus 400 illustrated in FIG. 1. As illustrated in FIG. 2, the processing circuit 440 reads the drive waveform determination program P from the memory circuit 430 and executes the program so as to function as a notification section 441, an input reception section 442, a determination section 443, a discharge controller 444, a discharge characteristics calculation section 445, and a waveform determination section 446.

The notification section 441 notifies the user of various kinds of information. In the present embodiment, the display device 410 displays an image so as to notify the user. The notification section 441 causes the display device 410 to display the information included in various kinds of data stored in the memory circuit 430. The input reception section 442 receives a user instruction on various kinds of information via the input device 420. The determination section 443 determines the user instruction based on the contents received by the input reception section 442. For example, the determination section 443 determines whether or not the user desires that the drive waveform determination method is manual. The discharge characteristics calculation section 445 obtains a discharge result from the measuring device 300 and obtains the discharge characteristics based on the discharge result. The waveform determination section 446 performs processing for determining the drive waveform.

Also, the display data D1 described above includes first information D11, third information D13, and eighth information D18. The first information D11 is the information to be used for the user to determine the drive waveform. Specifically, the first information D11 is the information for the user to determine to perform either the first determination method or the second determination method. The first determination method is the determination method for determining the drive waveform based on the user operation. That is to say, the first determination method is the determination method for the user manually determining the drive waveform. The second determination method is the determination method for determining the drive waveform without user operation. That is to say, the second determination method is the determination method for automatically determining the drive waveform.

The third information D13 is the information for determining the drive waveform by the first determination. Specifically, the third information D13 includes at least the information for the user setting the state value of the drive pulse PD, the information for performing a trial discharge using the set state value, and the information for evaluating a discharge result in the trial discharge.

The eighth information D18 is the information for determining the drive waveform by the second determination method. That is to say, the eighth information D18 is the information for determining the drive waveform without a user operation. Specifically, the eighth information D18 is the information for the user to recognize the state in which the drive waveform is determined by the second determination method. More Specifically, the eighth information D18 includes at least one of the information on the necessary time for performing the second determination method and the information on the number of drive waveforms having been tried during performing the second determination method.

The discharge characteristics data D2 includes discharge result information D21 and discharge characteristics information D22. The discharge result information D21 is the information indicating the discharge result of the measuring device 300. The discharge characteristics information D22 is the information indicating the discharge characteristics calculated based on the discharge result. In this regard, the discharge result information D21 and the discharge characteristics information D22 are individually overwritten, updated, or added.

The drive waveform data D3 includes initial waveform information D31, waveform candidate information D32, determination waveform information D33, and discharge waveform information D34. The initial waveform information D31 is the information indicating the initial waveform to be used for determining the drive waveform. The initial waveform information D31 is, for example, stored in the memory circuit 430 before starting the drive waveform determination method. The waveform candidate information D32 is the information indicating the drive waveform tentatively determined during a trial performed by drive waveform determination method. Specifically, the waveform candidate information D32 is stored when the determination processing of the drive waveform is performed by the first determination method. Also, the determination waveform information D33 is the information indicating the drive waveform determined by the drive waveform determination method. The determination waveform information D33 is stored in association with the information of whether the drive waveform is determined automatically or manually. Also, the discharge waveform information D34 is the information indicating the drive waveform to be used at the time of actually printing performed by the liquid discharge apparatus 200. In this regard, the waveform candidate information D32, the determination waveform information D33, and the discharge waveform information D34 are individually overwritten, updated, or added.

1.2 Waveform of Drive Pulse PD

Figure 3:
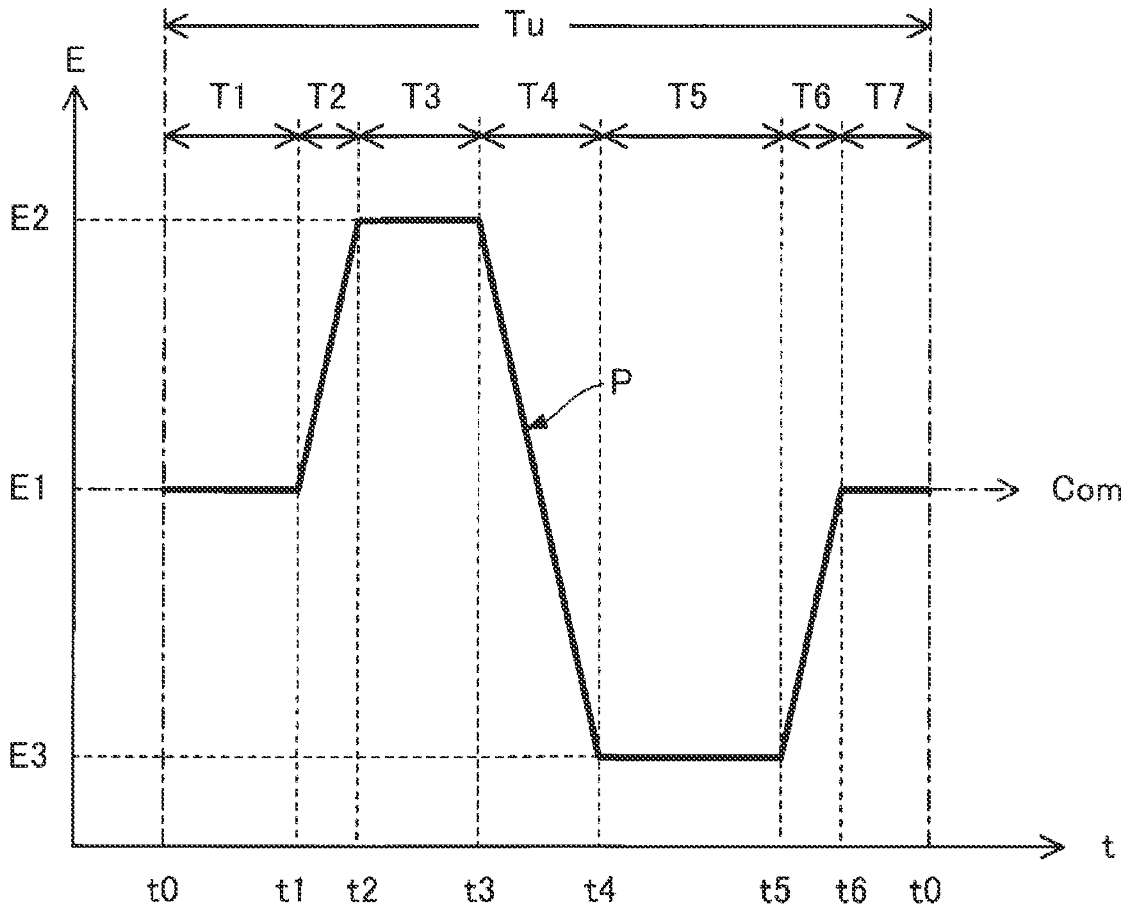
FIG. 3 is a diagram illustrating an example of a drive waveform.

FIG. 3 is a diagram illustrating an example of the waveform of the drive pulse PD. In this regard, the waveform of the drive pulse PD is not limited to the example illustrated in FIG. 3 and may have any form.

As illustrated in FIG. 3, the drive pulse PD is included in the drive signal Com for each unit period Tu. Potential E of the drive pulse PD rises from a potential E1, which is a reference, to a potential E2, and then falls to a potential E3 lower than the potential E1. After that, the potential E returns to the potential E1.

Specifically, the potential E of the drive pulse PD is first maintained at the potential E1 during a first period P1 from time t0 to time t1, and then rises to the potential E2 during a second period P2 from time t1 to time t2. The potential E of the drive pulse PD is maintained at the potential E2 during a third period P3 from time t2 to time t3, and then falls to the potential E3 during a fourth period P4 from time t3 to time t4. After that, the potential E of the drive pulse PD is maintained at the potential E3 during a fifth period P5 from time t4 to time t5, and then rises to the potential E1 during a sixth period P6 from time t5 to time t6. After that, the potential E of the drive pulse PD is maintained at the potential E1 during a seventh period P7 from time t6 to time t7.

When the drive pulse PD having the drive waveform illustrated in FIG. 3 is applied, the volume of the pressure chamber of the liquid discharge head 210 changes as follows. It is assumed that the volume of the pressure chamber in the first period P1 is a reference volume. In the second period P2, the volume of the pressure chamber increases with respect to the reference volume. In the third period P3, the state in which the volume of the pressure chamber has increased is maintained. In the fourth period P4, the volume of the pressure chamber decreases rapidly. By such changes in the volume of the pressure chamber in the second period P2, the third period P3, and the fourth period P4, a part of the ink in the pressure chamber is discharged from the nozzle as a droplet. After that, in the fifth period P5, the state in which the volume of the pressure chamber of the liquid discharge head 210 has decreased is maintained. In the sixth period P6, the volume of the pressure chamber increases, and in the seventh period P7, the volume of the pressure chamber returns to the reference volume. By the existence of the fifth period P5 and the sixth period P6 like this, the vibration of the meniscus caused by discharging ink from the nozzle is suppressed.

By setting the above-described period and state value, such as the potential, and the like, a desired drive waveform is determined. As a result, it is possible to obtain the discharge characteristics of the ink from the desired liquid discharge head 210.

1.3 Drive Waveform Determination Method

Figure 4:
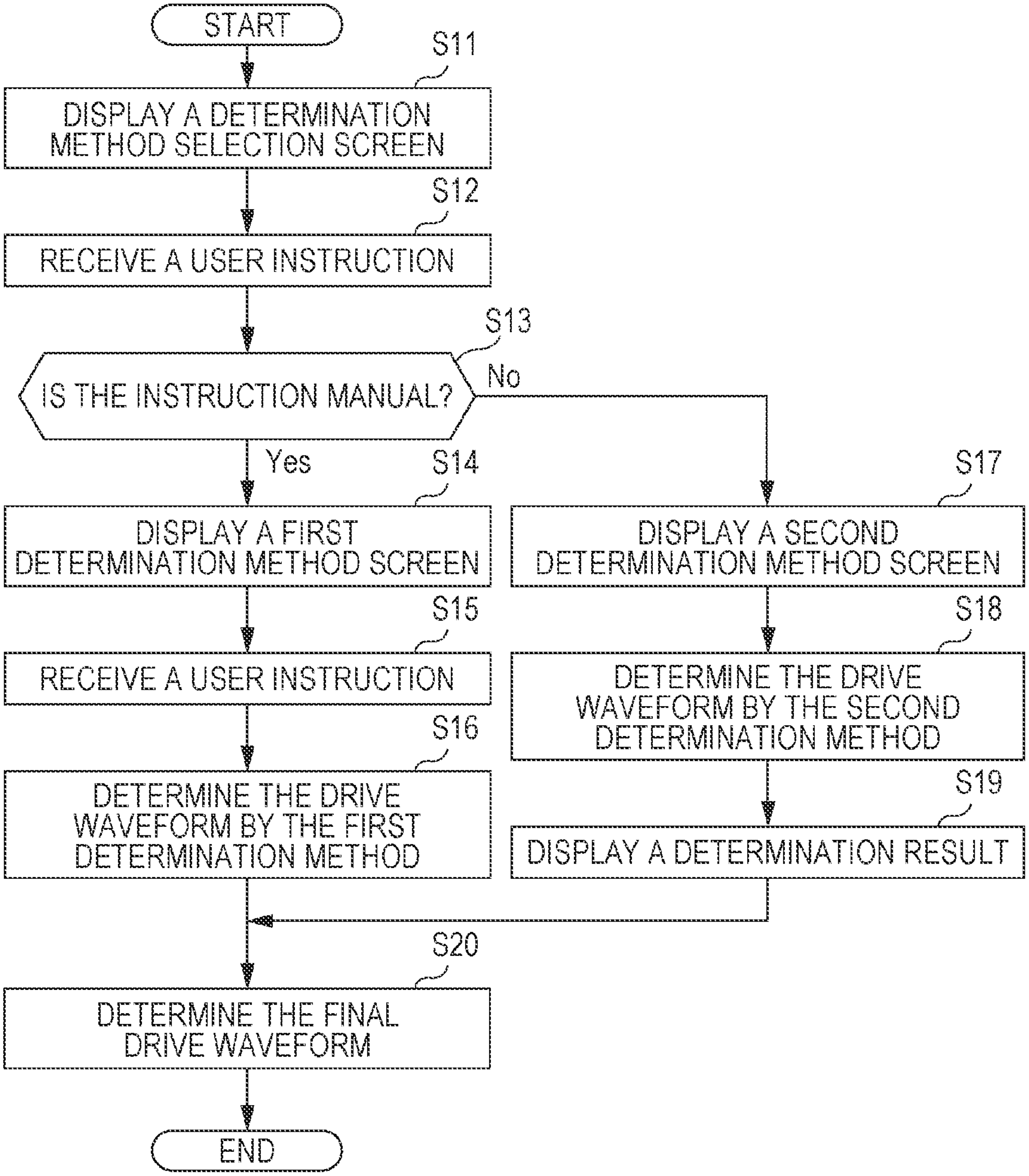
FIG. 4 is a flowchart illustrating a drive waveform determination method according to the first embodiment.

FIG. 4 is a flowchart illustrating the drive waveform determination method according to the first embodiment. The drive waveform determination method is a method of determining a drive waveform, which is the waveform of the drive pulse PD to be applied to the piezoelectric element 211 to discharge ink from the liquid discharge head. The drive waveform determination method is performed in advance of performing actual printing by the liquid discharge apparatus 200. For the actual printing performed by the liquid discharge apparatus 200, a drive pulse PD having the drive waveform determined by the drive waveform determination method is used. As a result, it is possible to obtain desired discharge characteristics of ink.

The drive waveform determination method includes a first step in which information for the user to select determining the drive waveform either manually or automatically is notified, and a second step in which the drive waveform is determined in accordance with the determination method determined by the user. Step S11 in FIG. 4 corresponds to the first step. Steps S13, S14, S15 and S16, or step S13, S17, S18 and S19 correspond to the second step. In the following, a description will be given of the drive waveform determination method with reference to FIG. 4. In this regard, the drive waveform determination method is started, for example, by receiving an instruction of the user who used the above-described input device 420 and executing the drive waveform determination program P.

First, in step S11, the notification section 441 notifies the user of the first information D11. Specifically, in step S11, the notification section 441 causes the display device 410 to display a determination method selection screen W10 on which the first information D11 is displayed.

Figure 5:
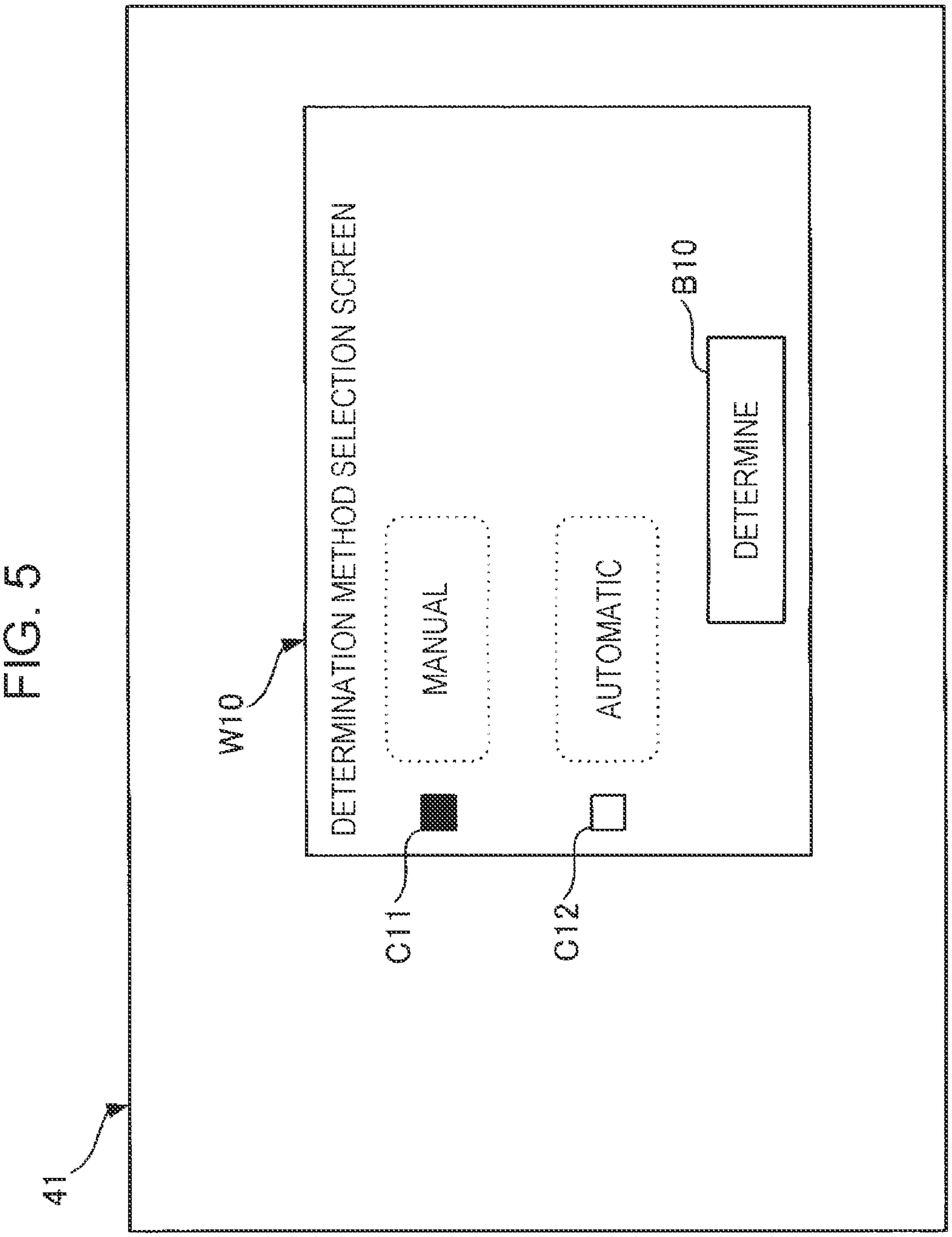
FIG. 5 is a diagram illustrating a determination method selection screen.
Figure 6:
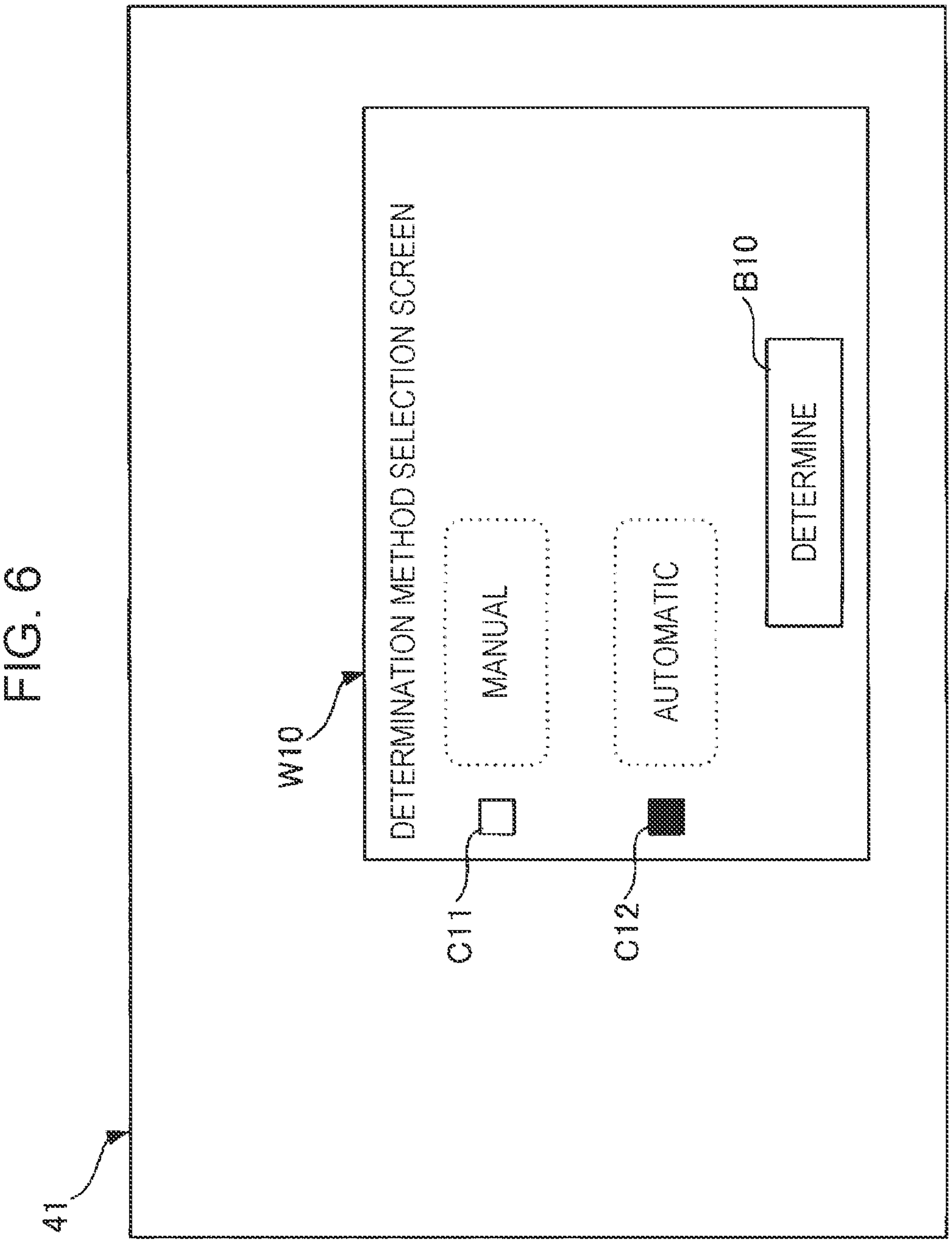
FIG. 6 is a diagram illustrating a determination method selection screen.

FIG. 5 and FIG. 6 are diagrams individually illustrating the determination method selection screen W10. The determination method selection screen W10 is displayed on a monitor 41 of the display device 410. The determination method selection screen W10 is a screen to be used for the user to determine to perform either the first determination method or the second determination method.

The determination method selection screen W10 includes a checkbox C11, a checkbox C12, and a determination button B10. The checkbox C11 is used for the user to select the first determination method. The checkbox C12 is used for the user to select the second determination method. When the user wants to manually determine the drive waveform, the user selects the checkbox C11 as illustrated in FIG. 5. Also, when the user wants to automatically determine the drive waveform, the user selects the checkbox C12 as illustrated in FIG. 6.

The determination button B10 is used for the user to determine to use whether the first determination method or the second determination method. Also, the determination button B10 is a button to shift to a screen for determining the drive waveform by the first determination method, or to shift to a screen for determining the drive waveform by the second determination method.

Next, in step S12, the input reception section 442 receives a user instruction on the determination method. Specifically, the input reception section 442 receives a user instruction on the determination method selection screen W10. More specifically, after the input reception section 442 receives the user operation on the checkbox C11 or C12, the input reception section 442 receives a user instruction on the determination button B10.

Next, in step S13, the determination section 443 determines whether or not the user instruction on the determination method is the first determination method. That is to say, in step S13, the determination section 443 determines whether or not the user instruction is manual.

When the input reception section 442 receives a user operation on the determination button B10 after receiving a check in the checkbox C11, the determination section 443 determines that the determination method is the first determination method. That is to say, the determination section 443 determines that the determination method is manual. Also, when the input reception section 442 receives a user operation on the determination button B10 after receiving a check in the checkbox C12, the determination section 443 determines that the determination method is not the first determination method, but the second determination method. That is to say, the determination section 443 determines that the determination method is not manual, but automatic.

In step S13, when the determination section 443 determines that the user instruction on the first information D11 is the first determination method, in step S14, the notification section 441 notifies the user of the third information D13 for determining the drive waveform by the first determination method. That is to say, in step S13, when it is determined that the determination section 443 is manual, in step S14, the notification section 441 causes the display device 410 to display a first determination screen W20 on which the third information D13 is displayed.

Figure 7:
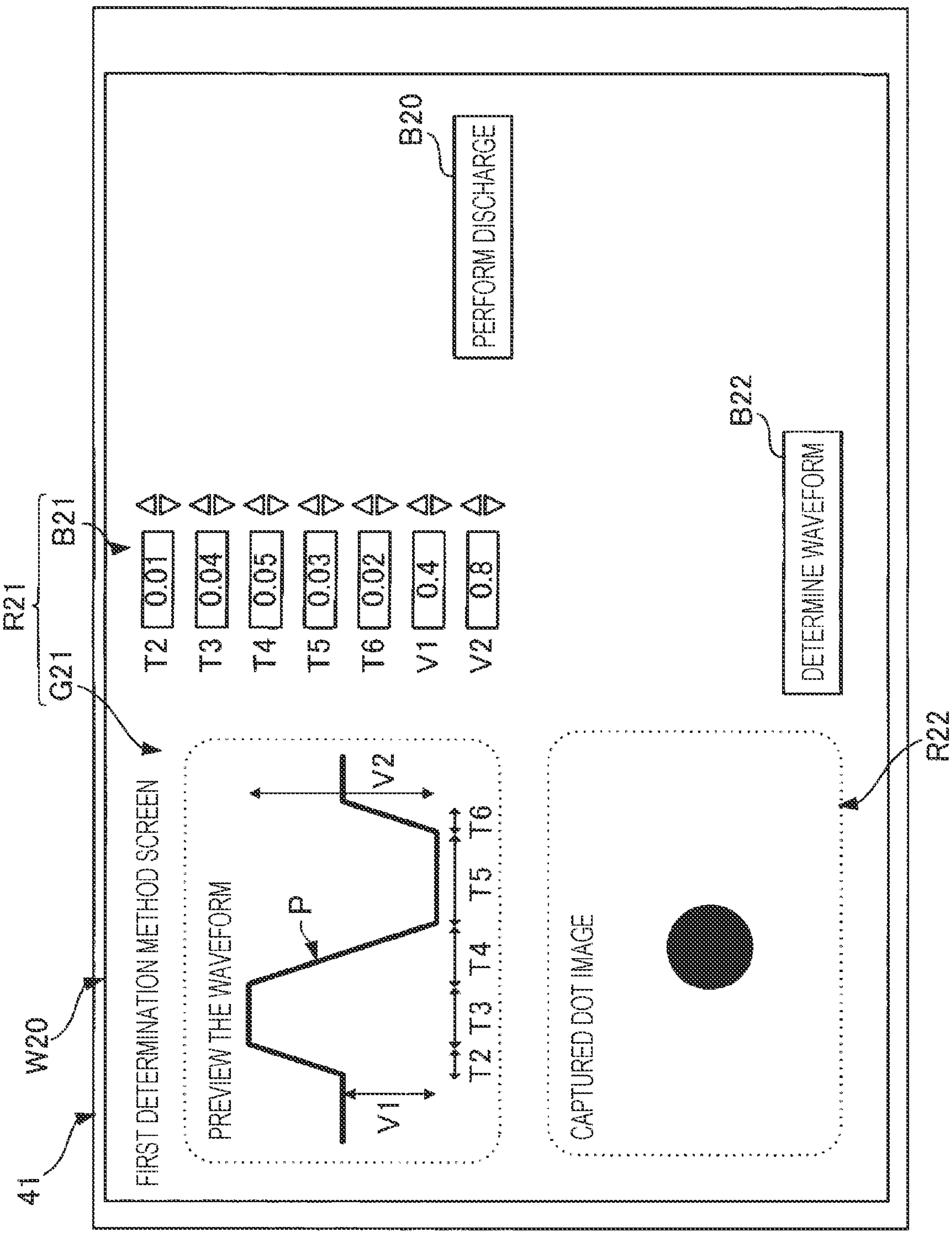
FIG. 7 is a diagram illustrating a first determination screen.

FIG. 7 is a diagram illustrating the first determination screen W20. The first determination screen W20 is a screen for the user to determine the drive waveform by the first determination method. In the example illustrated in FIG. 7, the first determination screen W20 includes a waveform determination area R21, a discharge result area R22, a discharge execution button B20, and a waveform determination button B22.

In the waveform determination area R21, the information for setting the state value of the drive pulse PD is displayed. The waveform determination area R21 includes an image G21 indicating the drive waveform of the drive pulse PD, and a combo box group B21 for adjusting the state values.

The combo box group B21 includes a plurality of combo boxes. The plurality of combo boxes are used for setting the state values. The state values represent the above-described period indicating the state of the drive pulse PD, the potential, and the like. Specifically, for the state values, the above-described second period P2, third period P3, fourth period P4, fifth period P5, and sixth period P6 are given. Further, for the state values, potential differences V1 and V2 are given. The potential difference V1 is the difference between the potential E1 and the potential E2, that is to say, the amplitude. The potential difference V3 is the difference between the potential E2 and the potential E3. It is possible for the user to set the state values displayed in the combo box group B21 so as to design a desired drive waveform.

In the image G21, the drive waveform is displayed. Specifically, for example, before a user operation is performed on the combo box group B21, the waveform indicating the initial waveform information D31 is displayed. Also, after the user operation is performed on the combo box group B21, the waveform indicating the waveform candidate information D32 is displayed.

The discharge execution button B20 is used for performing a trial discharge of ink from the nozzle of the liquid discharge apparatus 200. A trial discharge is a discharge using a drive waveform that is tentatively determined during trials before the final determination.

In the discharge result area R22, a discharge result for evaluating a result of a trial discharge is displayed. Specifically, in the discharge result area R22, a discharge result obtained by the measuring device 300 is displayed. In the present embodiment, an image of the ink that has impacted on a print medium, or the like is displayed. In this regard, in the discharge result area R22, the discharge characteristics, such as an area in which the ink impacted, and the like may be displayed in addition to or instead of a discharge result. Also, the waveform determination button B22 is used by the user to determine the drive waveform.

In step S15, the input reception section 442 receives a user instruction. Specifically, for example, the input reception section 442 receives a user operation on the combo box group B21 and then receives a user operation on the discharge execution button B20. In response to this operation, the waveform determination section 446 generates a drive waveform designed by the user as a tentatively determined drive waveform. The memory circuit 430 stores information on the tentatively determined drive waveform as the waveform candidate information D32. Also, the discharge controller 444 sends the waveform candidate information D32 to the liquid discharge apparatus 200. The liquid discharge apparatus 200 that has received the waveform candidate information D32 generates a drive pulse PD based on the waveform candidate information D32 and causes ink to be discharged from a nozzle.

After the nozzle discharges ink, the discharge characteristics calculation section 445 obtains a discharge result from the measuring device 300 and calculates the discharge characteristics based on the discharge result. Also, the memory circuit 430 stores the obtained discharge result as the discharge result information D21, and stores the discharge characteristics as discharge characteristics information D22. Also, the notification section 441 notifies the user of the discharge result. As a result, the discharge result is displayed in the discharge result area R22 described above.

The user visually recognizes the discharge result displayed in the discharge result area R22 so as to evaluate whether or not the discharge state of ink is a desired state. When the user does not evaluate as a desired state, the user performs an operation on the combo box group B21 again. On the other hand, when the user evaluates as a desired state, the user performs an operation on the waveform determination button B22. In this regard, the waveform determination section 446 may evaluate whether or not the discharge state of ink is a desired state. In this case, the memory circuit 430 stores a discharge result, in which the discharge state of ink is in a desired state, as evaluation information in advance. The waveform determination section 446 compares the evaluation information and the discharge characteristics information D22 and evaluates whether or not the discharge state of ink is the desired state.

In step S15, when the input reception section 442 receives the operation by the user on the waveform determination button B22, in step S16, the waveform determination section 446 determines that the waveform designed by the user is a new drive waveform. The memory circuit 430 stores the new drive waveform as the determination waveform information D33.

In step S20, the waveform determination section 446 finally determines that the new drive waveform is the waveform of the drive pulse PD to be applied to the liquid discharge apparatus 200 in the actual printing. The memory circuit 430 stores the drive waveform as the discharge waveform information D34. The drive pulse PD having the drive waveform represented by the discharge waveform information D34 is recorded as the waveform of the drive pulse PD to be actually applied to the liquid discharge apparatus 200. The drive waveform is used for actual printing by the liquid discharge apparatus 200.

Also, in step S13, when the determination section 443 determines that the user instruction on the first information D11 is the second determination method, in step S17, the notification section 441 notifies the user of the eighth information D18 to be used for determining the drive waveform by the second determination method. That is to say, in step S13, when the determination section 443 determines as automatic, the notification section 441 causes the display device 410 to display a second determination screen W30 indicating the eighth information D18. Also, after the notification section 441 starts notification of the eighth information D18, the waveform determination section 446 starts the processing for determining the drive waveform by the second determination method.

Figure 8:
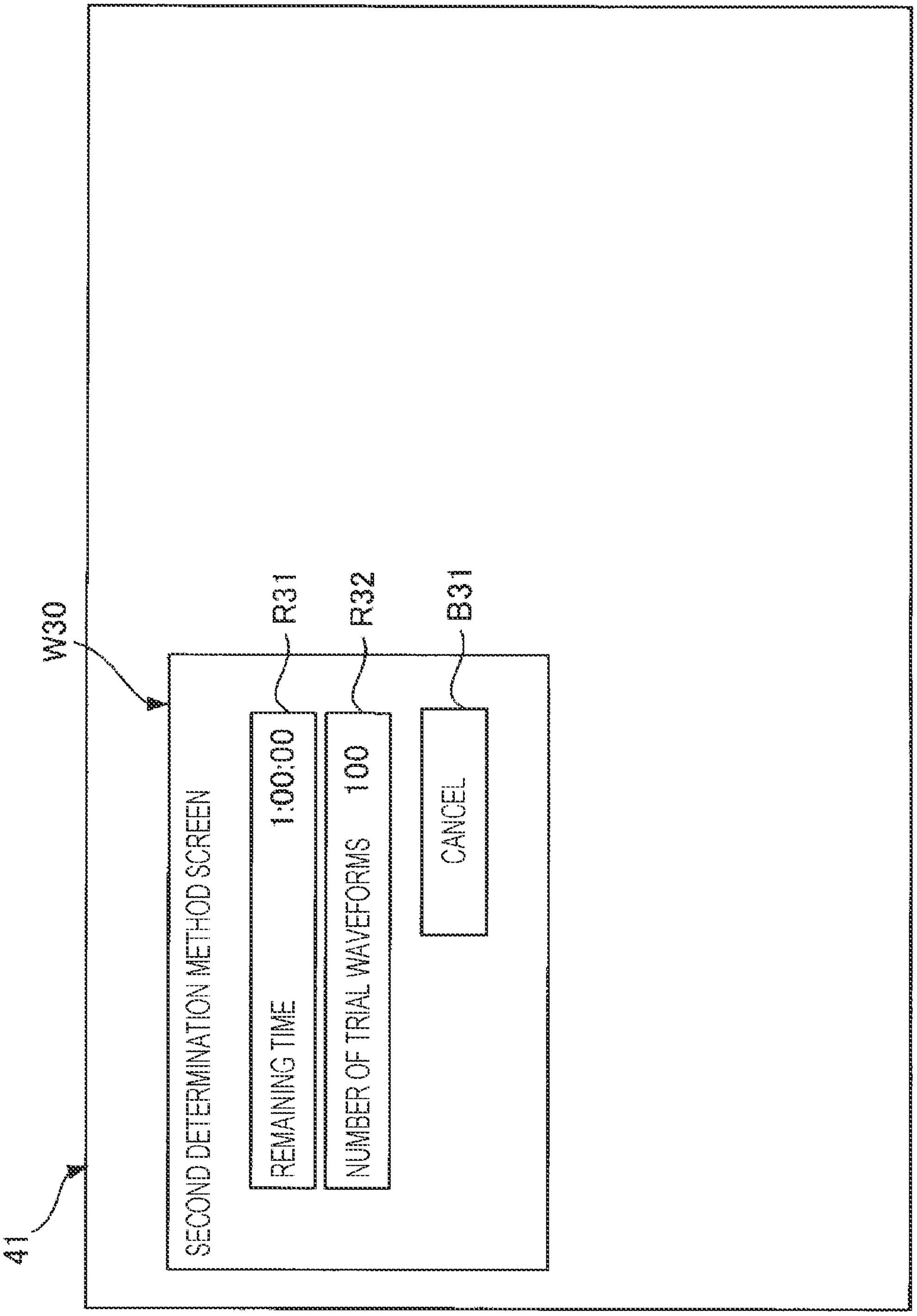
FIG. 8 is a diagram illustrating a second determination screen.

FIG. 8 is a diagram illustrating the second determination screen W30. The second determination screen W30 illustrated in FIG. 8 is a screen for use in determining the drive waveform by the second determination method. In the example illustrated in FIG. 8, the second determination screen W30 includes a time display area R31, a number of trials display area R32, and a cancel button B31.

In the time display area R31, information on the necessary time by the second determination method is displayed. In the example illustrated in FIG. 8, the remaining time until the drive waveform is determined is displayed in the time display area R31. Also, the number of trial drive waveforms during execution of the determination processing of the drive waveform by the second determination method is displayed in the number of trials display area R32. In the example illustrated in FIG. 8, the number of trials is displayed in the countdown mode is displayed in the number of trials display area R32.

The cancel button B31 is used to cancel the determination of the drive waveform by the second determination method. When the input reception section 442 receives a user operation on the cancel button B31, the waveform determination section 446 cancels the determination processing of the drive waveform by the second determination method.

In step S18, when the trials of the drive waveform end, the waveform determination section 446 determines the drive waveform based on a trial result. The memory circuit 430 stores the new drive waveform as the determination waveform information D33. Also, the discharge controller 444 sends the determination waveform information D33 to the liquid discharge apparatus 200. The liquid discharge apparatus 200 that has received the waveform candidate information D32 generates a drive pulse PD based on the waveform candidate information D32 so as to discharge ink from the nozzle. After the ink is discharged from the nozzle, the discharge characteristics calculation section 445 obtains a discharge result from the measuring device 300 and calculates the discharge characteristics based on the discharge result. Also, the memory circuit 430 stores the obtained discharge result as discharge result information D21, and stores the discharge characteristics as discharge characteristics information D22.

In step S19, the notification section 441 notifies the user of the discharge result. Specifically, the notification section 441 causes the display device 410 to display a determination result display screen W35 on which the discharge result is displayed. At this time, the notification section 441 may cause the display device 410 to display only a determination result display screen W35 indicating one discharge result automatically determined that a favorable discharge result has been obtained based on the discharge result information D21. Also, the notification section 441 may cause the display device 410 to display a plurality of determination result display screens W35 indicating the corresponding discharge results in a display switchable state.

Figure 9:
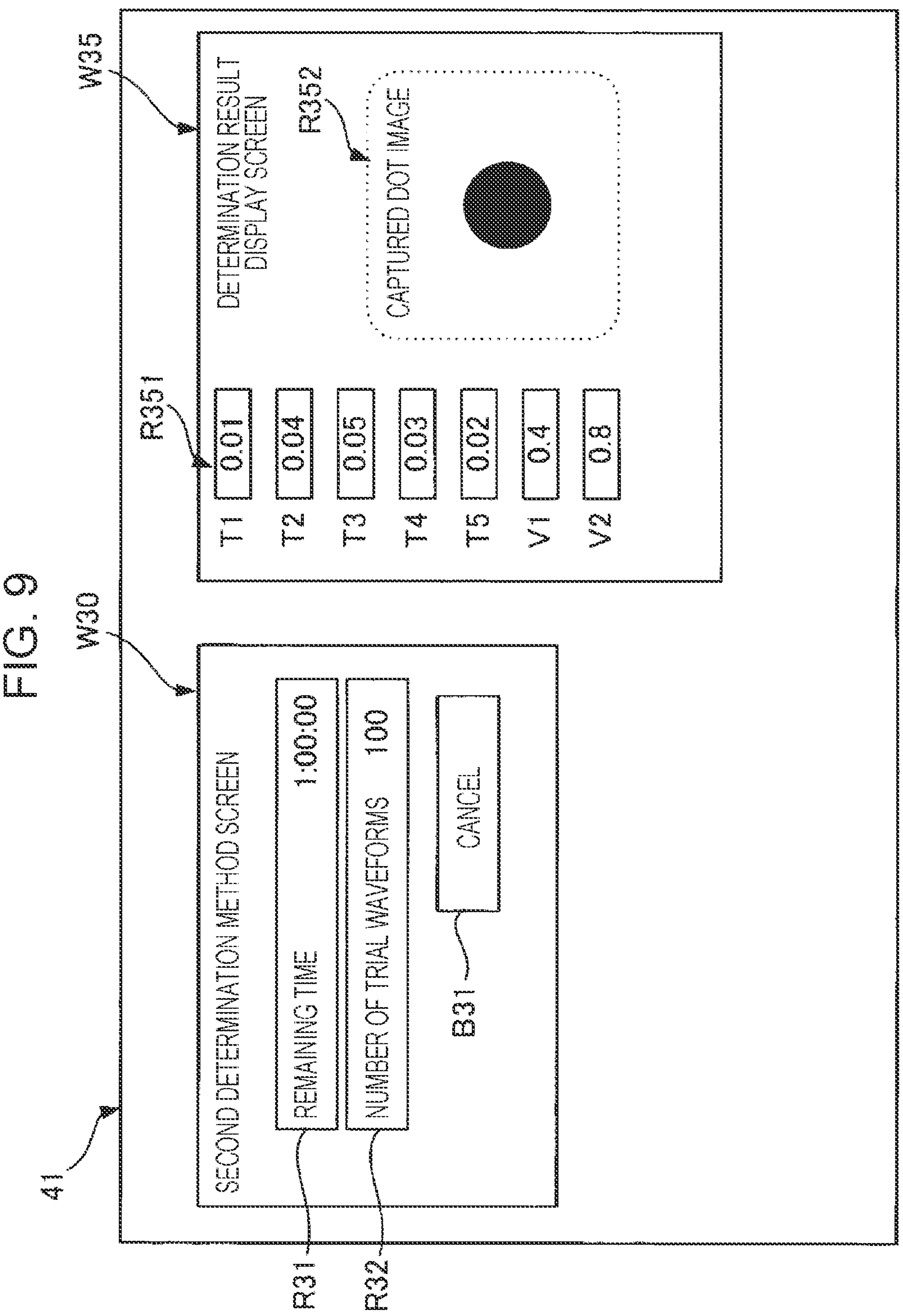
FIG. 9 is a diagram illustrating a determination result display screen.

FIG. 9 is a diagram illustrating the determination result display screen W35. The determination result display screen W35 illustrated in FIG. 9 includes a state value display area R351 and a result display area R352.

In the state value display area R351, a state value of the determined drive waveform is displayed. In this regard, a determined drive waveform may be displayed in the state value display area R351. Also, a discharge result obtained by the measuring device 300 is displayed in the result display area R352. In the present embodiment, the image of the ink that impacted on the print medium, or the like is displayed. In this regard, the discharge characteristics, such as the area of the ink that impacted on the print medium, or the like, may be displayed in addition to or instead of the discharge result in the result display area R352.

By visually recognizing such a determination result display screen W35, it is possible for the user to know the state value and the discharge result of the drive waveform determined automatically. In this regard, step S19 is included in the present embodiment. However, step S19 may be omitted. That is to say, the determination result display screen W35 may not be displayed.

After the notification section 441 notifies the user of the determination result display screen W35, in step S20, the waveform determination section 446 finally determines the new drive waveform as the waveform of the drive pulse PD to be applied to the liquid discharge apparatus 200 at the actual printing. The memory circuit 430 stores the drive waveform as the discharge waveform information D34. The drive pulse PD of the drive waveform indicated by the discharge waveform information D34 is recorded as the waveform of the drive pulse PD that is to be actually applied in the liquid discharge apparatus 200. The drive waveform is used for actual printing by the liquid discharge apparatus 200.

By the above-described method, the drive waveform is determined manually or automatically. As described above, the drive waveform determination method includes first step and second step. In step S11, which is the first step, the notification section 441 notifies the user of the first information D11 for determining whether to perform the first determination method for determining the drive waveform based on a user operation user or to perform the second determination method for determining the drive waveform without a user operation. In the second step, the drive waveform is determined in accordance with the first determination method or the second determination method, either of which is determined by the user based on the instruction on the first information D11. In step S13, when the determination method determined by the user is determined as the first determination method, the processing in steps S14, S15 and S16 is performed. Also, when the determination method determined by the user is determined as the second determination method in step S13, processing of step S17, S18 and S19 is performed.

The drive waveform determination method includes step S11, so that it is possible for the user to select whether to determine the drive waveform manually or to determine the drive waveform automatically. Accordingly, it is possible to improve usability. For example, when the user is inexperienced in the determination processing of the drive waveform, it is possible for the user select the automatic processing so as to reduce excessive load. On the other hand, for example, when the user is experienced in the drive waveform processing, the user selects the manual processing so that it is possible to efficiently set a desirable drive waveform for the user.

Also, as described above, in the drive waveform determination method, when an instruction on the first information D11 is the first determination method, the user is notified of the third information D13 for determining the drive waveform by a user operation. In the present embodiment, in the case of the first determination method, the first determination screen W20 indicating the third information D13 is displayed is in step S14. Accordingly, it is possible for the user to set the drive waveform by using the first determination screen W20.

Further, as described above, the third information D13 includes at least the information for setting the state value of the drive waveform, the information for performing a trial discharge in the set state value, and the information for evaluating a discharge result in a trial discharge. In the present embodiment, the first determination screen W20 including the waveform determination area R21 and the discharge result area R22 are displayed on the monitor 41. By using the waveform determination area R21, it is possible for the user to easily design a desired drive waveform by setting the state value. Also, by using the discharge execution button B20, it is possible to perform a trial discharge by using the drive pulse PD having a tentatively determined drive waveform. Further, by using the discharge result area R22, it is possible for the user to visually recognize a discharge result of ink output by a trial discharge. Accordingly, it is possible for the user himself or herself to evaluate whether or not the ink output by a trial discharge is in a discharge state. Thus, based on the discharge result, it is possible for the user to determine the drive waveform when the trial discharge is in a desirable state, and to set the drive waveform again when the trial discharge is in an undesirable state. Accordingly, it is user friendly for a user who is experienced in the drive waveform determination processing.

On the other hand, in the drive waveform determination method, when the instruction on the first information D11 is the second determination method, in step S17, the user is notified of the eighth information D18 including at least one of the information on the necessary time in the second determination method and the information on the number of the drive waveforms tried during the execution of the second determination method. In the present embodiment, the second determination screen W30 including the time display area R31 and the number of trials display area R32 is displayed on the monitor 41. By using the time display area R31 or the number of trials display area R32, it is possible for the user to grasp the progress state of the processing for determining the drive waveform. Accordingly, compared with the case of not displaying the second determination screen W30, it is convenient for a user who is inexperienced in the determination processing of the drive waveform.

By the drive waveform determination method described above, it is possible to improve user friendliness for both a user who is experienced in the determination processing of the drive waveform and a user who is inexperienced. Accordingly, by using the drive waveform determination method described above, it is possible to improve usability for various persons.

In this regard, the drive waveform determination method described above may be performed a plurality of times. In the first determination of the drive waveform, by adjusting an initial waveform, a new drive waveform is determined. In the second determination of the drive waveform and after that, for example, by adjusting the drive waveform determined before that, the next new drive waveform is determined. By performing the determination of the drive waveform a plurality of times, it is possible to further improve the discharge characteristics. Also, by performing the determination of the drive waveform regularly, it is possible to stabilize the discharge characteristics. Further, for example, when changing the ink type or the print contents, by performing the determination of the drive waveform before actually discharging ink, it is possible to obtain the discharge characteristics suitable for the ink type or the print contents. Accordingly, it is possible to produce a printed material having a high quality.

2. Second Embodiment

A description will be given of a second embodiment. In this regard, in the following examples, a component having the same function as that of the first embodiment is given a sign that is used in the description of the first embodiment, and the detailed description of each component will be suitably omitted.

2.1 Information Processing Apparatus 400

Figure 10:
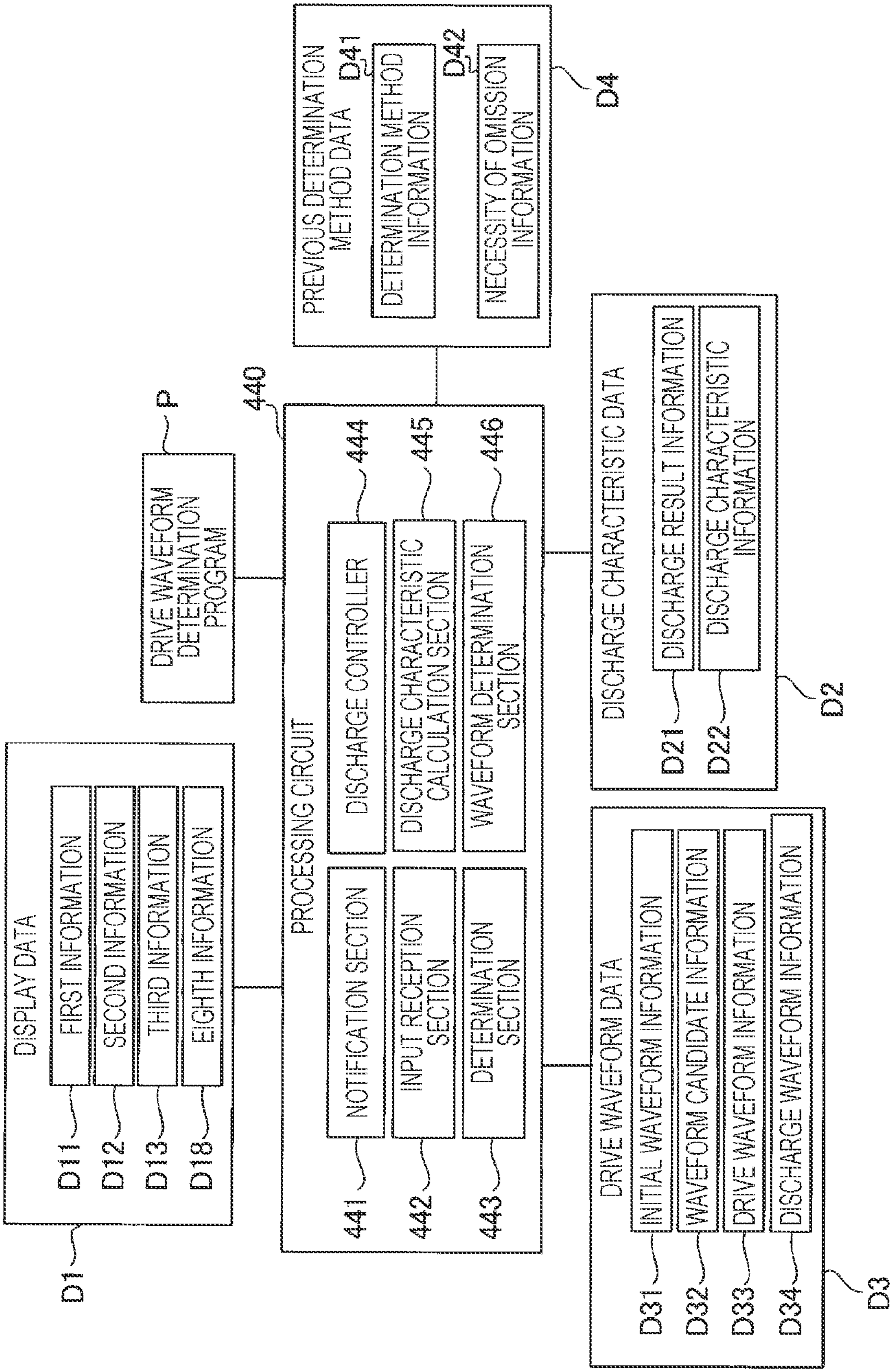
FIG. 10 is a diagram illustrating an example of the functional configuration of an information processing apparatus according to a second embodiment.

FIG. 10 is an example of the functional configuration of the information processing apparatus 400 according to the second embodiment. The display data D1 including second information D12 and previous determination method data D4 are stored in the memory circuit 430 of the information processing apparatus 400 according to the present embodiment.

The second information D12 is the information for the user to determine whether or not the notification of the first information D11 is omitted in the previous determination of the drive waveform. Specifically, the second information D12 is the information for the user, in step S11 when the previous drive waveform is determined, to give an instruction again of determining whether to select the first determination method or the second determination method in determining the next drive waveform. That is to say, the second information D12 is the information to be used, for example, for the user to determine whether or not to omit the display of the determination method selection screen W10 in the determination processing of the second drive waveform at the time of the first drive waveform determination processing.

The previous determination method data D4 includes the information on the previous determination method. The previous determination method data D4 includes determination method information D41 and necessity of omission information D42. The determination method information D41 is the information indicating whether the determination method selected in step S11 is the first determination method or the second determination method. The necessity of omission information D42 is the information on the omission instruction of notification of the first information D11. The determination method information D41 and the necessity of omission information D42 are associated with each other. The determination method information D41 and the necessity of omission information D42 are overwritten, updated, or added.

2.2 Drive Waveform Determination Method

In the present embodiment, the first drive waveform determination method has differences from the second drive waveform determination method and after that. The first drive waveform determination method follows the flowchart illustrated in FIG. 4 according to the first embodiment. However, in the first drive waveform determination method, in step S11, a determination method selection screen W10A is displayed in FIG. 11 or FIG. 12.

Figure 11:
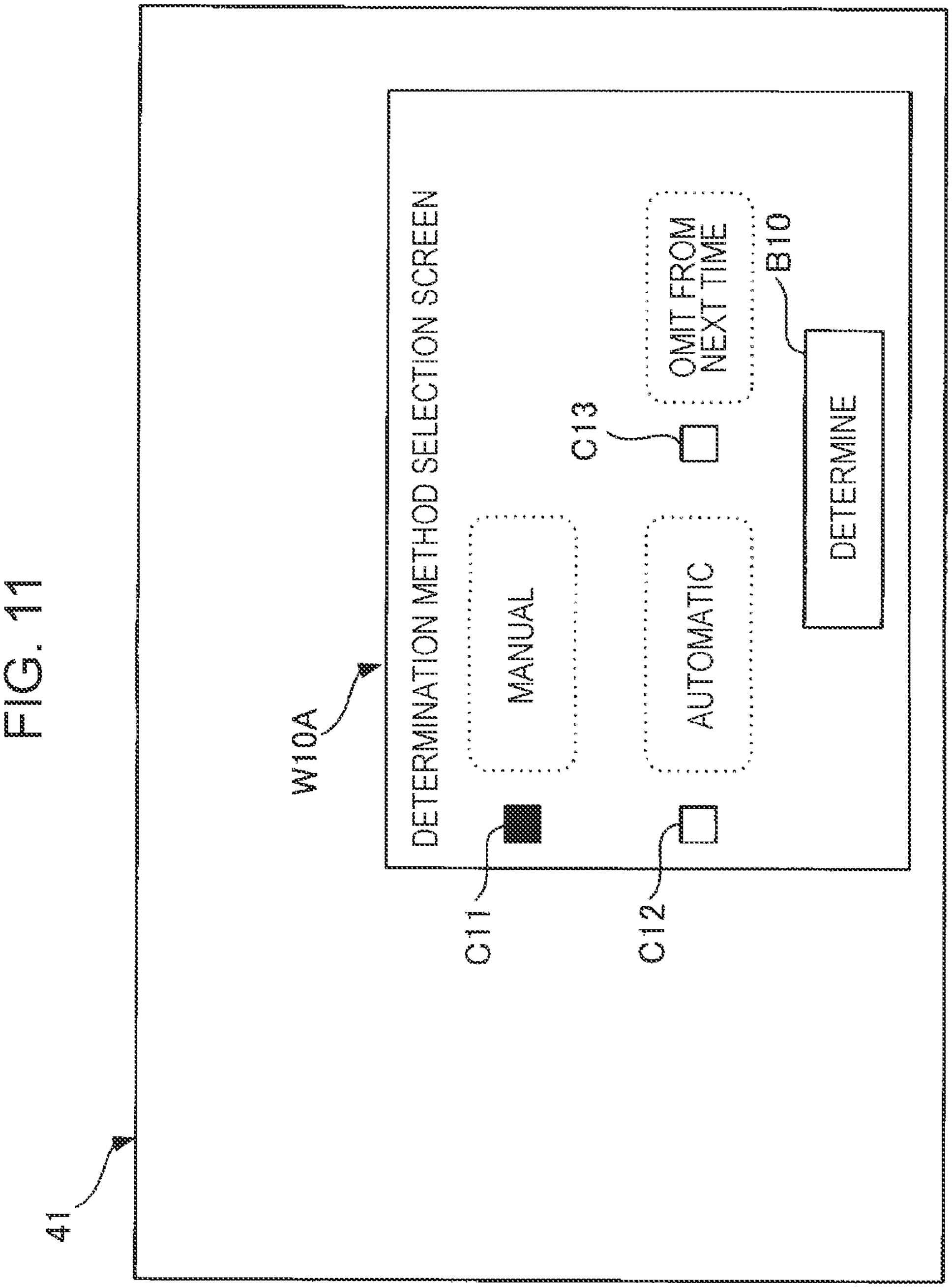
FIG. 11 is a diagram illustrating a determination method selection screen according to the second embodiment.
Figure 12:
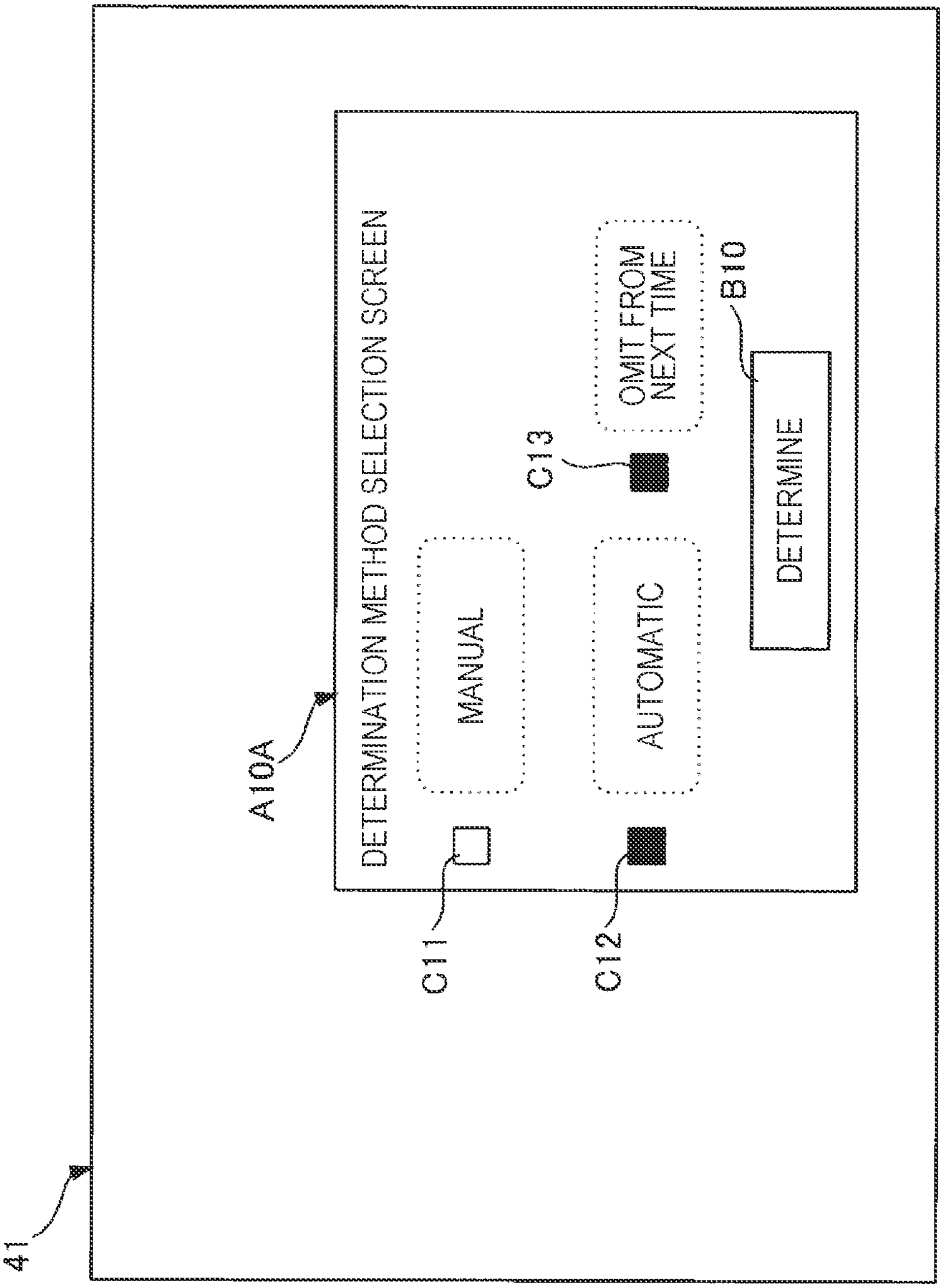
FIG. 12 is a diagram illustrating a determination method selection screen according to the second embodiment.

FIG. 11 and FIG. 12 are diagrams individually illustrating the determination method selection screen W10A according to the second embodiment. In step S11, the notification section 441 causes the display device 410 to display the determination method selection screen W10A on which the first information D11 and the third information D13 are displayed. The determination method selection screen W10 further includes an omission checkbox C13 in addition to the checkbox C11, the checkbox C12, and the determination button B10.

The omission checkbox C13 is used for the user to determine the necessity of giving again an instruction to determine either the first determination method or the second determination method when determining the next drive waveform. The omission checkbox C13 is associated with the checkbox C12. Accordingly, when the drive waveform is automatically determined, it is possible to select whether or not an instruction on the determination method is omitted in the next determination processing of the drive waveform. In this regard, in the present embodiment, when the drive waveform is manually determined, it is not possible to select whether or not the determination method is omitted in the next determination processing of the drive waveform.

After the input reception section 442 receives the check in the checkbox C12 in step S12, when the input reception section 442 receives the check in the omission checkbox C13, the determination section 443 determines that the determination method is the second determination method in step S13. In this case, the memory circuit 430 stores the determination method information D41 indicating the second determination method and the necessity of omission information D42 indicating that an omission instruction has been received.

Also, after the input reception section 442 receives the check of the checkbox C12 in step S12 when the input reception section 442 does not receive the check in the omission checkbox C13, the determination section 443 determines that the determination method is the second determination method in step S13. In this case, the memory circuit 430 stores the determination method information D41 indicating the second determination method and the necessity of omission information D42 indicating that the omission instruction has not been received.

Also, when the input reception section 442 receives the check in the checkbox C11 in step S12, the determination section 443 determines that the determination method is not the first determination method in step S13. In this case, the memory circuit 430 stores the determination method information D41 indicating the first determination method and the necessity of omission information D42 indicating that the omission instruction has not been received.

Figure 13:
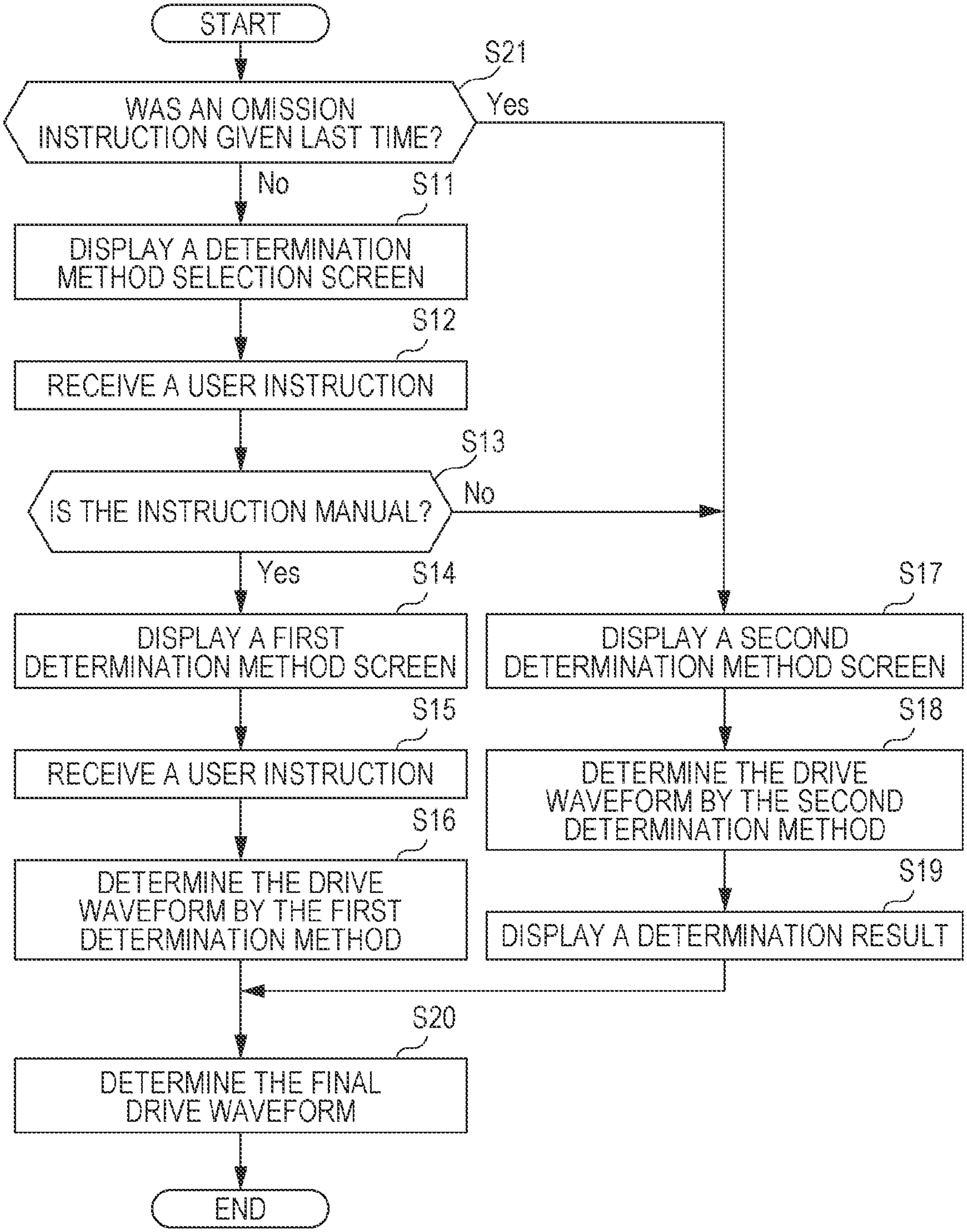
FIG. 13 is a flowchart illustrating a drive waveform determination method of the second time and after that according to the second embodiment.

FIG. 13 is a flowchart illustrating the drive waveform determination method of the second time or after that according to the second embodiment. As illustrated in FIG. 13, step S21 is added to the drive waveform determination method of the second time or after that with respect to the drive waveform determination method of the first time.

In step S21, the determination section 443 determines whether or not an instruction on the second information D12 has been given in step S11 when the previous drive waveform. That is to say, in step S21, the determination section 443 determines whether or not it is necessary to give again an instruction on determining either the first determination method or the second determination method in the determination processing of the drive waveform at this time. Specifically, the determination section 443 determines whether or not an omission instruction has been given in the previous determination processing of the drive waveform based on the determination method information D41 and the necessity of omission information D42.

In step S21, when the determination section 443 determines that an instruction on the second information D12 has not been given, that is to say, the omission instruction has been given, a third step, in which the drive waveform is determined in accordance with the determination method when determining the previous drive waveform, is executed. Steps S17 and S18 illustrated in FIG. 13 correspond to the third step. Accordingly, when the omission instruction is given, the notification section 441 notifies the user of the eighth information D18. That is to say, when the omission instruction is given, the notification section 441 omits the display of the determination method selection screen W10 and causes the display device 410 to display the second determination screen W30. Accordingly, the user gives the omission instruction at the previous determination processing of the drive waveform so as to have no need to select again the determination method at the next determination processing of the drive waveform. Thus, it is possible to reduce the number of user operations. Accordingly, it is possible to more simplify the determination processing of the drive waveform.

Here, when the user is inexperienced in the determination of the drive waveform, and the number of the determination processing of the drive waveform is large, the user is likely to feel the burden more than an experienced user. Accordingly, since it is possible to give the omission instruction at the time of automatically determining the drive waveform, it is possible for the user who is inexperienced in the determination of the drive waveform to reduce the load.

Also, in step S21, when the determination section 443 determines that it is necessary to give the instruction on the second information D12, that is to say, when determined that the omission instruction has not been given, the first step and the second step are performed. Accordingly, when the omission instruction has not been given, the same processing as the drive waveform determination method of the first time is performed. Accordingly, for example, it is possible to enable the user who wants to change the determination method every time the user performs the determination processing of the drive waveform to get convenience.

With the second embodiment described above, it is possible to improve usability. In this regard, in the present embodiment, when the second determination method is selected, it is possible to give the omission instruction. However, when the first determination method is selected, it may be possible to give the omission instruction.

3. Third Embodiment

A description will be given of a third embodiment. In this regard, in the following examples, a component having the same function as that of the first embodiment is given a sign that is used in the description of the first embodiment, and the detailed description of each component will be suitably omitted.

3.1 Information Processing Apparatus 400

Figure 14:
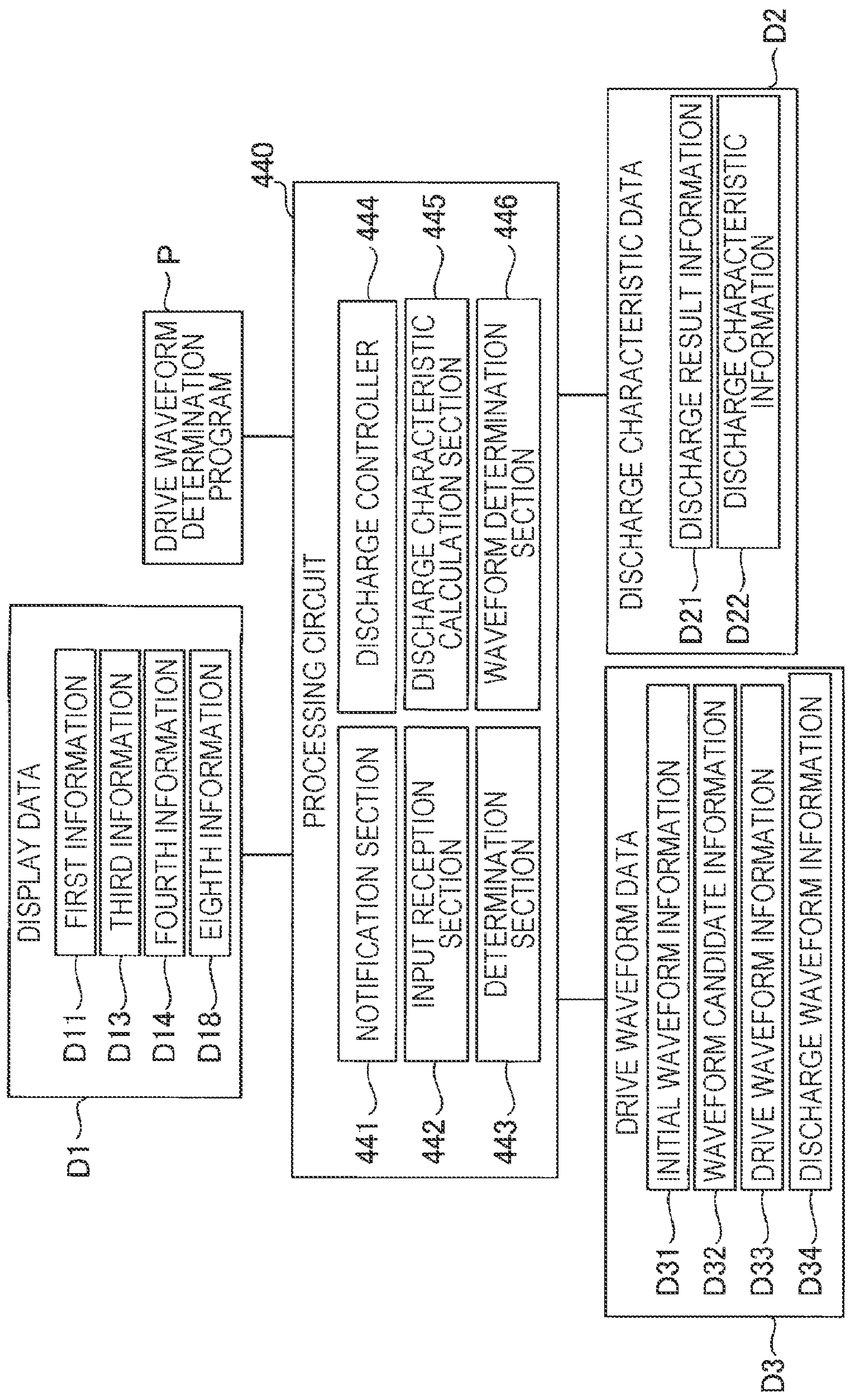
FIG. 14 is a diagram illustrating an example of the functional configuration of an information processing apparatus according to a third embodiment.

FIG. 14 is a diagram illustrating an example of the functional configuration of the information processing apparatus 400 according to the third embodiment. The memory circuit 430 of the information processing apparatus 400 according to the present embodiment stores the display data D1 including fourth information D14. The fourth information D14 is the information for changing from the first determination method to the second determination method in the middle of performing the determination processing of the drive waveform by the first determination method.

3.2 Drive waveform Determination Method

Figure 15:
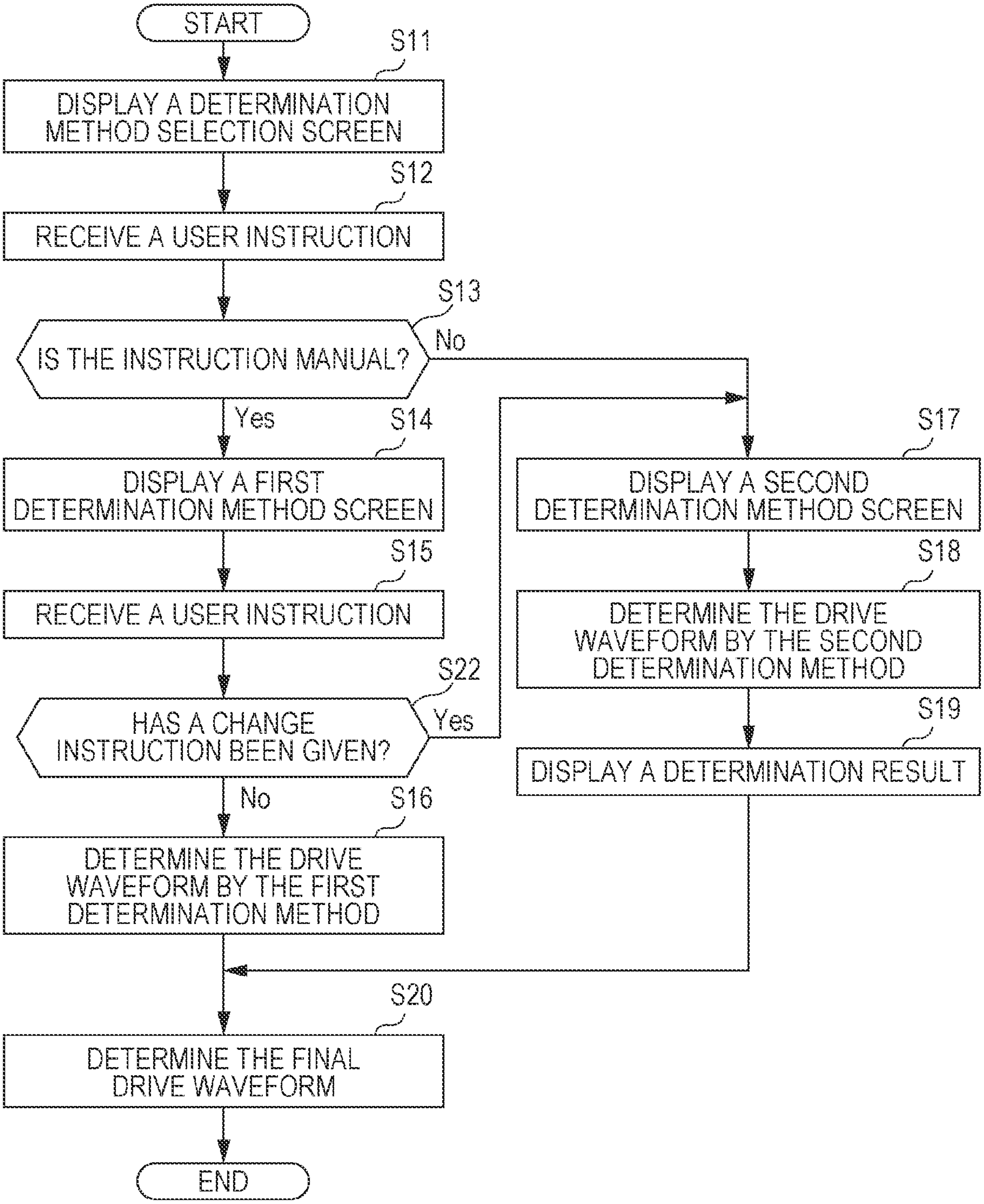
FIG. 15 is a flowchart illustrating a drive waveform determination method according to the third embodiment.
Figure 16:
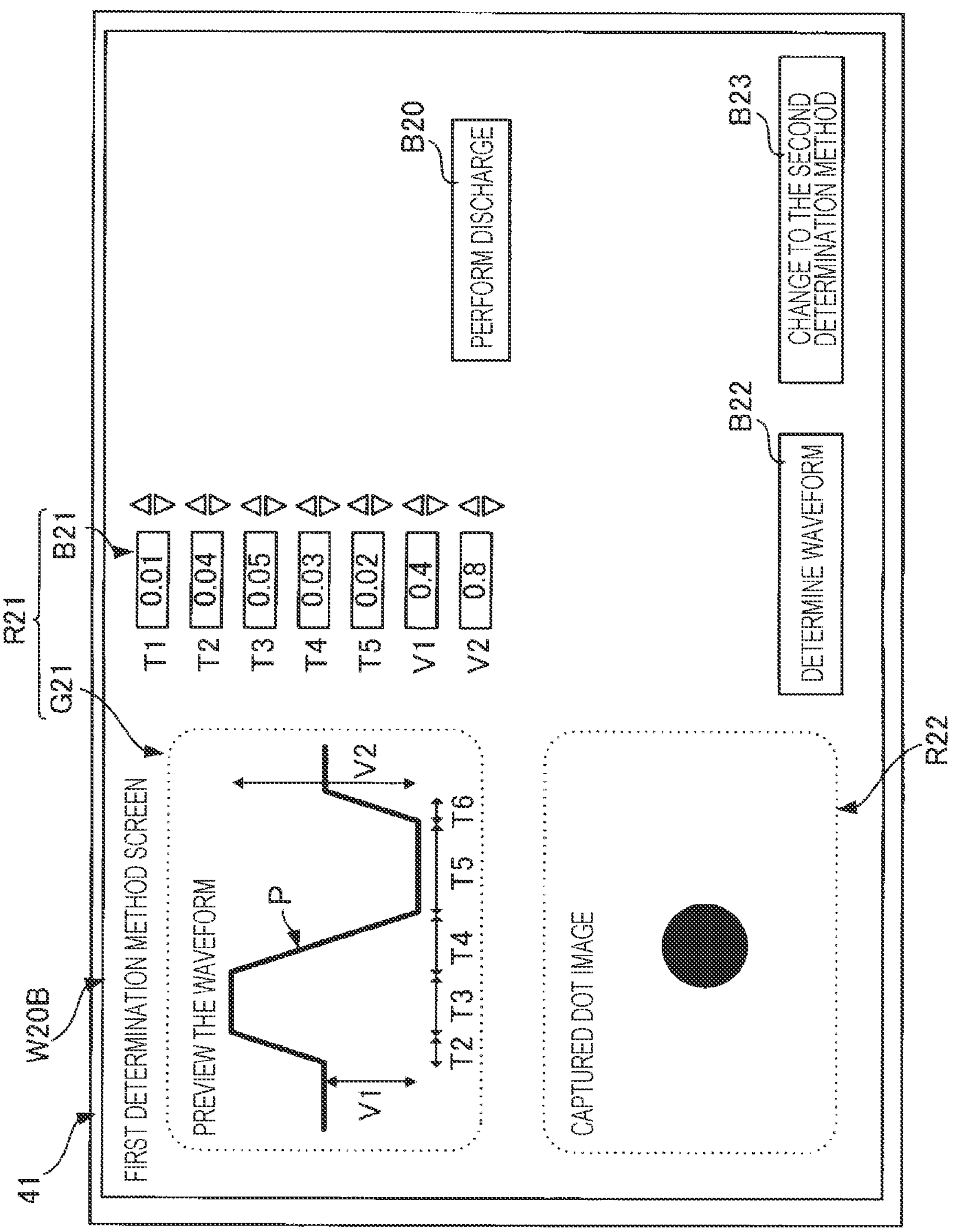
FIG. 16 is a diagram illustrating a first determination screen according to the third embodiment.

FIG. 15 is a flowchart illustrating a drive waveform determination method according to the third embodiment. FIG. 16 is a diagram illustrating a first determination screen W20B according to the third embodiment. In the drive waveform determination method according to the present embodiment, step S22 is added to the drive waveform determination method according to the first embodiment. Also, the first determination screen W20B includes a part different from that of the first determination screen W20 according to the first embodiment.

In step S13 illustrated in FIG. 15, when the user instruction on the first information D11 is the first determination method, the notification section 441 notifies the user of the third information D13 and the fourth information D14 in step S14. Specifically, when the determination section 443 determines as manual in step S13, the notification section 441 causes the display device 410 to display the first determination screen W20B on which the third information D13 is displayed in step S14.

The first determination screen W20B illustrated in FIG. 16 includes a change button B23 in addition to the waveform determination area R21, the discharge result area R22, the discharge execution button B20, and the waveform determination button B22. The change button B23 is used for changing from the first determination method to the second determination method.

In step S15, the input reception section 442 receives a user instruction. When the input reception section 442 receives a user instruction, the determination section 443 determines whether or not the instruction is a change instruction in step S22. That is to say, the determination section 443 determines whether or not the input reception section 442 has received the user operation on the change button B23.

When the user operation on the change button B23 has not been received, the waveform determination section 446 generates a drive waveform in accordance with the user instruction received by the input reception section 442 in the same manner as in the first embodiment in step S16.

On the other hand, when the user operation on the change button B23 has been received, the processing of step S17 is performed. That is to say, when the user operation on the change button B23 is received, the waveform determination section 446 terminates the determination processing of the drive waveform by the first determination method, and starts the determination processing of the drive waveform by the second determination method.

As described above, in the present embodiment, the user is notified of the fourth information D14 for changing from the first determination method to the second determination method during the execution of the determination processing of the drive waveform by the first determination method. Accordingly, for example, when the user tried manual determination of the drive waveform, but the work does not proceed smoothly, it is possible to change from manual to automatic. Accordingly, compared with the case of not having a mechanism to change from the first determination method to the second determination method, it is possible to improve usability for the user.

With the third embodiment described above, it is possible to improve usability. In this regard, in the present embodiment, it is possible to change from the first determination method to the second determination method. However, it may be possible to change from the second determination method to the first determination method.

4. Fourth Embodiment

A description will be given of a fourth embodiment. In this regard, in the following examples, a component having the same function as that of the first embodiment is given a sign that is used in the description of the first embodiment, and the detailed description of each component will be suitably omitted.

4.1 Information Processing Apparatus 400

Figure 17:
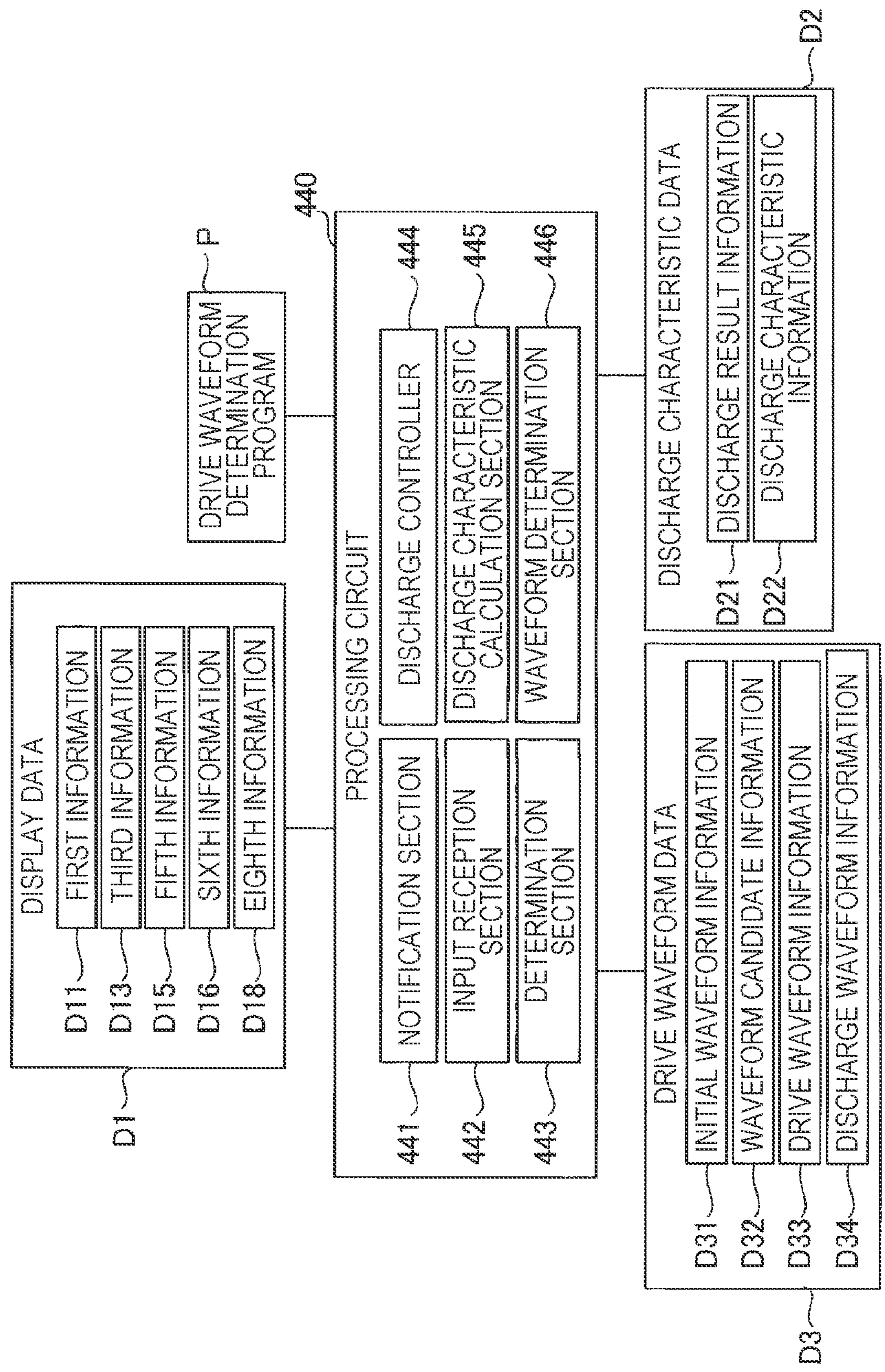
FIG. 17 is a diagram illustrating an example of the functional configuration of an information processing apparatus according to a fourth embodiment.

FIG. 17 is a diagram illustrating an example of the functional configuration of the information processing apparatus 400 according to the fourth embodiment. The memory circuit 430 of the information processing apparatus 400 according to the present embodiment stores the display data D1 including fifth information D15 and sixth information D16. The fifth information D15 is the information for the user to determine whether or not it is possible to actually use the drive waveform as the waveform of the drive pulse PD to be applied after determining the drive waveform by the second determination method. That is to say, the fifth information D15 is the information for the user to determine whether or not to use the drive waveform automatically determined for the waveform to be used for the actual printing by the liquid discharge apparatus 200. The sixth information D16 is the information for the user to determine whether or not it is necessary to perform the determination processing of the drive waveform by the second determination method again after determining the drive waveform by the second determination method.

4.2 Drive Waveform Determination Method

Figure 18:
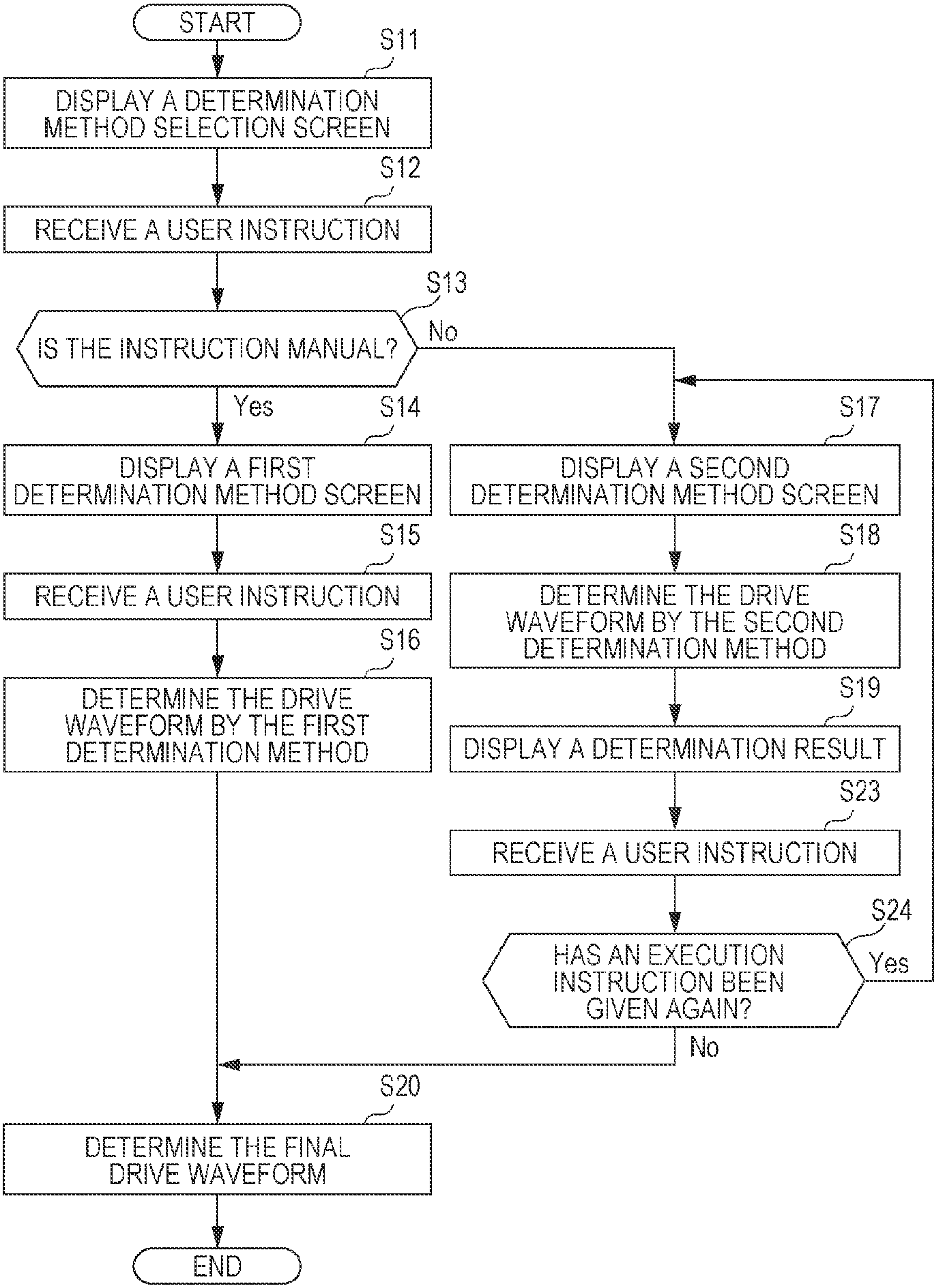
FIG. 18 is a flowchart illustrating a drive waveform determination method according to the fourth embodiment.
Figure 19:
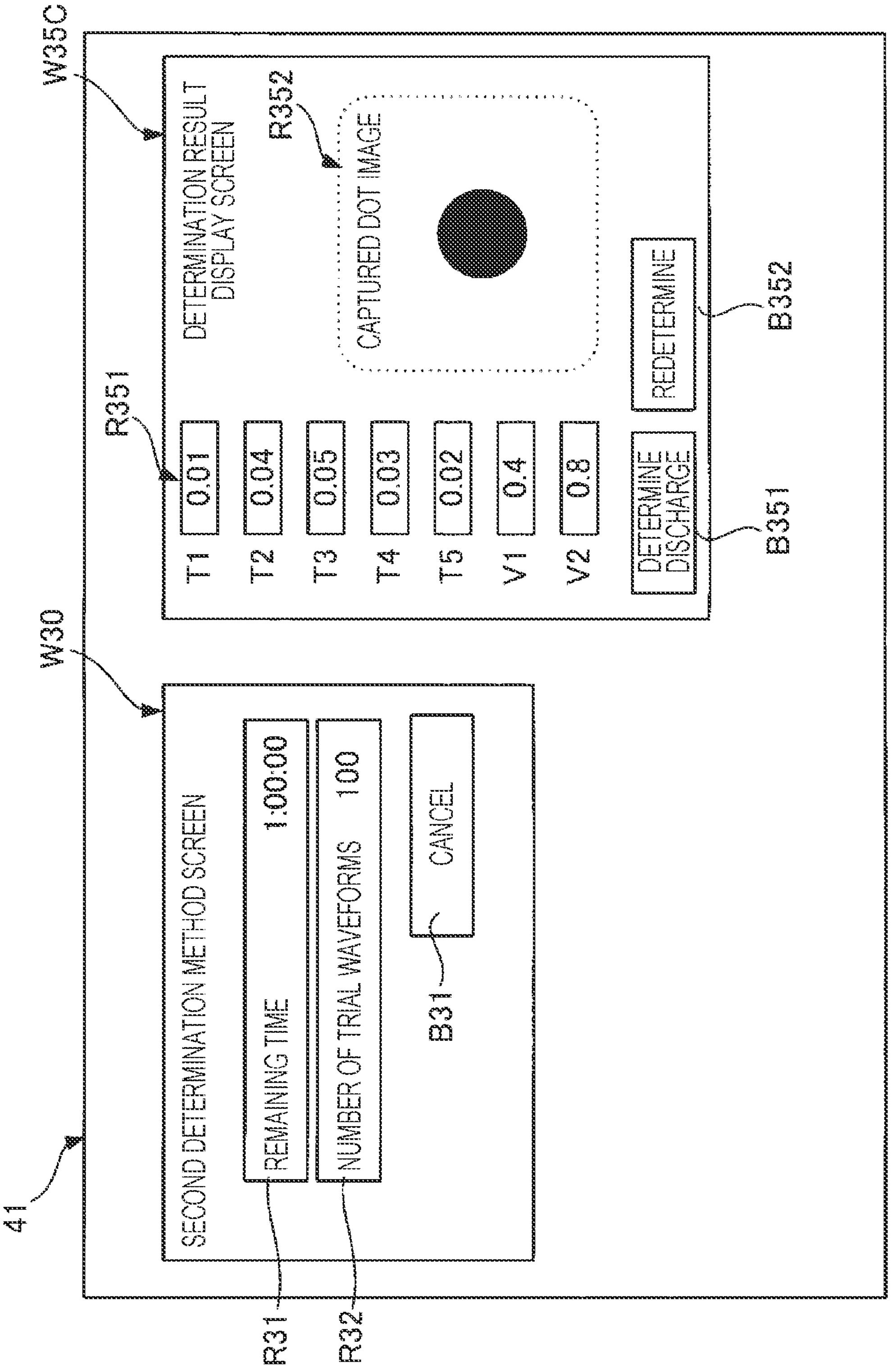
FIG. 19 is a diagram illustrating a determination result display screen according to the fourth embodiment.

FIG. 18 is a flowchart illustrating the drive waveform determination method according to the fourth embodiment. FIG. 19 is a diagram illustrating a determination result display screen W35C according to the fourth embodiment. In the drive waveform determination method according to the present embodiment, steps S23 and S24 are added to the drive waveform determination method according to the first embodiment. Also, the determination result display screen W35C includes a part different from that of the determination result display screen W35 according to the first embodiment.

In step S18 illustrated in FIG. 18, when a trail of the drive waveform ends, the waveform determination section 446 determines the drive waveform based on a trial result. The memory circuit 430 stores the new drive waveform as the determination waveform information D33.

In step S19, the notification section 441 notifies the user of the discharge result when the discharge is performed by the drive pulse PD having the new drive waveform. Specifically, the notification section 441 causes the display device 410 to display the determination result display screen W35C on which the discharge result is displayed.

The determination result display screen W35C illustrated in FIG. 19 includes a discharge determination button B351 indicating the fifth information D15 and a redetermination button B352 indicating the sixth information D16 in addition to the state value display area R351 and the result display area R352. The discharge determination button B351 is used for determining whether or not to apply the drive pulse PD having the drive waveform. That is to say, the discharge determination button B351 is used for determining the drive waveform determined by the second determination method as the waveform of the drive pulse PD to be used for actual printing by the liquid discharge apparatus 200. Also, the redetermination button B352 is used for the user to determine whether or not it is necessary to perform the determination processing of the drive waveform by the second determination method again. Either the discharge determination button B351 or the redetermination button B352 is selected.

In step S23, the input reception section 442 receives an instruction on either the fifth information D15 or the sixth information D16. Specifically, the input reception section 442 receives an instruction on either the discharge determination button B351 or the redetermination button B352.

In step S24, the determination section 443 determines whether or not the user instruction is an instruction on the sixth information D16. That is to say, the determination section 443 determines whether or not the instruction for performing again the determination processing of the drive waveform by the second determination method has been received.

When the user operation on the redetermination button B352 has been received, the determination section 443 determines that the instruction to perform again the determination processing of the drive waveform by the second determination method has been given. That is to say, the determination section 443 determines that an instruction on the sixth information D16 is necessary. In this case, the processing returns to step S17, and the notification section 441 causes the display device 410 to display the second determination screen W30 on which the eighth information D18 is displayed. In step S18, the waveform determination section 446 determines again the drive waveform by the second determination method.

Also, when the user operation on the discharge determination button B351 has been received, the determination section 443 determines that the instruction to perform again the determination processing of the drive waveform by the second determination method has not been given. That is to say, the determination section 443 determines that the instruction on the sixth information D16 is negation, and an instruction on the fifth information D15 has been given. In this case, in step S20, the waveform determination section 446 finally determines the new drive waveform determined by the second determination method as the waveform of the drive pulse PD to be applied in the actual printing by the liquid discharge apparatus 200. Also, the memory circuit 430 stores the drive waveform as the discharge waveform information D34.

As described above, after the drive waveform is determined by the second determination method, the discharge determination button B351 indicating the fifth information D15 is displayed. Accordingly, it is possible for the user to determine whether or not to use the drive pulse PD having the drive waveform determined automatically for actual printing by the liquid discharge apparatus 200. Thus, compared with the case in which the user is not able to determine whether or not to use for the actual situation, it is possible to use the drive waveform that meets the user request in the actual printing. Accordingly, usability is improved more.

Also, as described above, the redetermination button B352 indicating the sixth information D16 for the user to determine the necessity of performing the second determination method again is displayed. Accordingly, when the drive waveform determined automatically is not a drive waveform that meets the user request, it is possible to perform the determination of the drive waveform again. Thus, compared with the case of having no opportunity for performing the determination of the drive waveform again, it is possible to design a drive waveform that meets a user request.

With the fourth embodiment described above, it is possible to improve usability.

5. Fifth Embodiment

A description will be given of a fifth embodiment. In this regard, in the following examples, a component having the same function as that of the first embodiment is given a sign that is used in the description of the first embodiment, and the detailed description of each component will be suitably omitted.

5.1 Information Processing Apparatus 400

Figure 20:
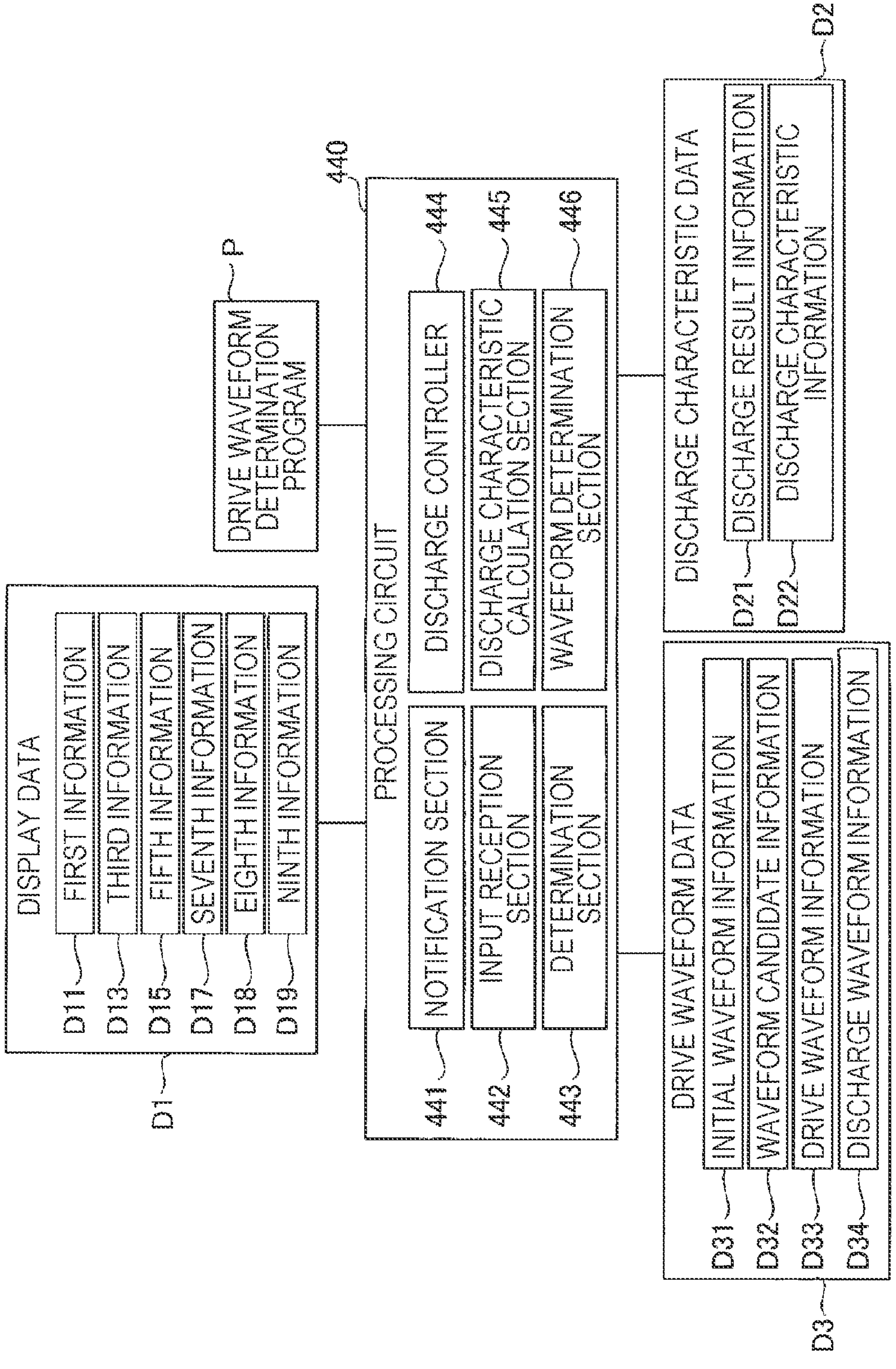
FIG. 20 is a diagram illustrating an example of the functional configuration of an information processing apparatus according to a fifth embodiment.

FIG. 20 is a diagram illustrating an example of the functional configuration of the information processing apparatus 400 according to the fifth embodiment. The memory circuit 430 of the information processing apparatus 400 according to the present embodiment stores the display data D1 including the fifth information D15, seventh information D17, and ninth information D19. The fifth information D15 illustrated in FIG. 20 is the same as that of the fifth information D15 according to the fourth embodiment. The description of the fifth information D15 has been described in the fourth embodiment, and thus is suitably omitted. Also, the seventh information D17 is the information for the user to adjust the drive waveform. The ninth information D19 is the information for determining the drive waveform by the user operation with reference to the drive waveform determined automatically.

5.2 Drive waveform Determination Method

Figure 21:
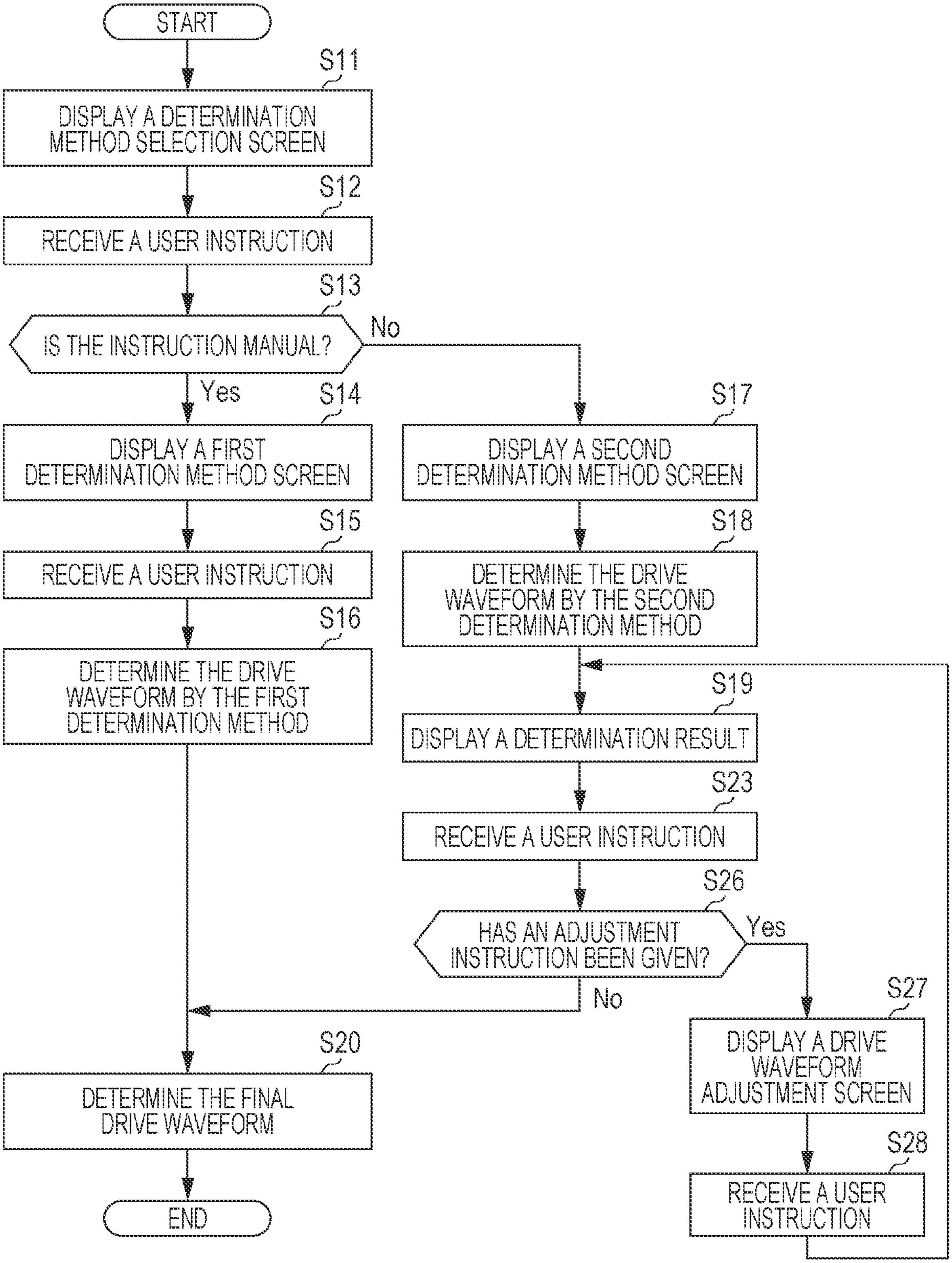
FIG. 21 is a flowchart illustrating a drive waveform determination method according to the fifth embodiment.
Figure 22:
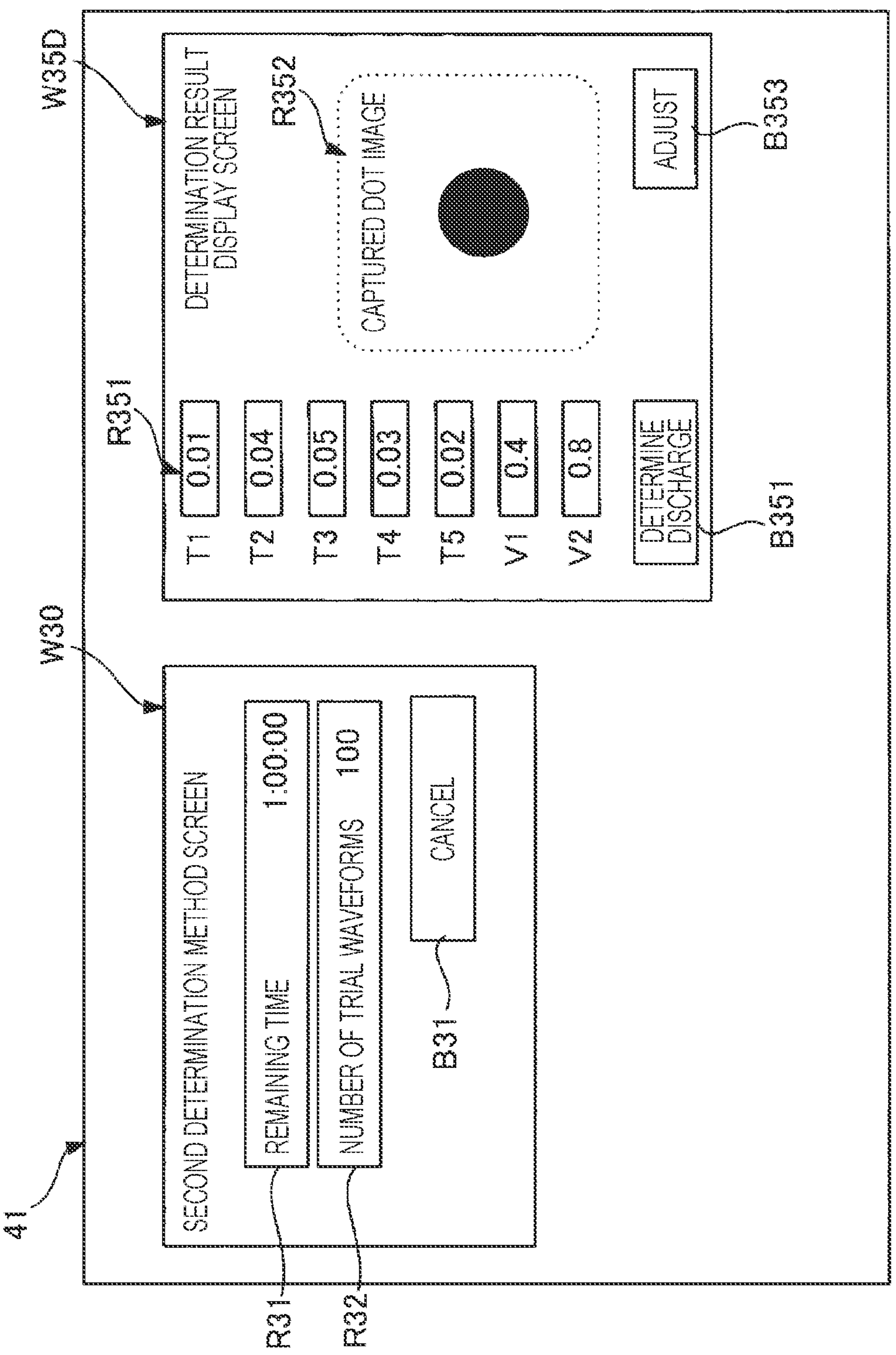
FIG. 22 is a diagram illustrating a determination result display screen according to the fifth embodiment.

FIG. 21 is a flowchart illustrating a drive waveform determination method according to the fifth embodiment. FIG. 22 is a diagram illustrating a determination result display screen W35D. In the drive waveform determination method according to the present embodiment, steps S23, S25, S26 and S27 are added to the drive waveform determination method according to the first embodiment. Also, the determination result display screen W35D includes a part different from that of the determination result display screen W35 according to the first embodiment.

In step S18 illustrated in FIG. 21, when a trial of the drive waveform ends, the waveform determination section 446 determines a drive waveform based on a trial result. The memory circuit 430 stores the new drive waveform as the determination waveform information D33.

In step S19, the notification section 441 notifies the user of a discharge result when the discharge is performed by using the drive pulse PD having the drive waveform indicated by the determination waveform information D33. Specifically, the notification section 441 causes the display device 410 to display the determination result display screen W35D on which the discharge result, and the like are displayed.

The determination result display screen W35D illustrated in FIG. 22 includes the discharge determination button B351 indicating the fifth information D15 and an adjustment button B353 indicating the seventh information D17 in addition to the state value display area R351 and the result display area R352. The discharge determination button B351 is the same as that of the discharge determination button B351 according to the fourth embodiment. The description of the discharge determination button B351 has been given in the description of the fourth embodiment, and thus is suitably omitted. Also, the adjustment button B353 is used for the user to adjust the drive waveform. Either the discharge determination button B351 or the adjustment button B353 is selected.

In step S23, the input reception section 442 receives an instruction on either the fifth information D15 or the seventh information D17. Specifically, the input reception section 442 receives the instruction on either the discharge determination button B351 or the adjustment button B353.

In step S23, when a user operation on the adjustment button B353 is received, in step S26, the determination section 443 determines that an adjustment instruction on the drive waveform has been given. That is to say, in step S26, the determination section 443 determines that an instruction on the seventh information D17 is necessary. In this case, in step S27, the notification section 441 causes the display device 410 to display a waveform adjustment screen W40 on which the ninth information D19 is displayed.

Figure 23:
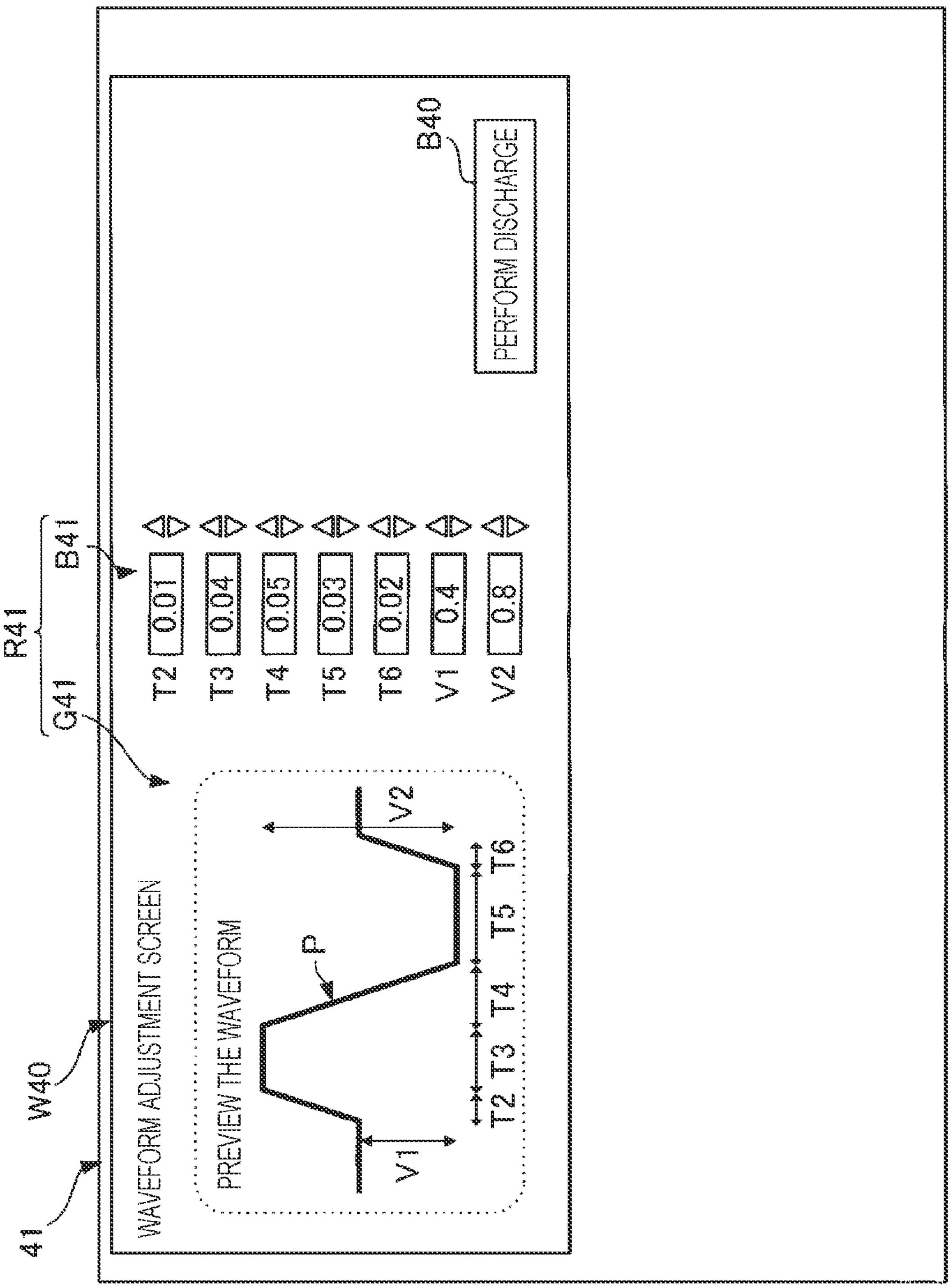
FIG. 23 is a diagram illustrating a waveform adjustment screen according to the fifth embodiment.

FIG. 23 is a diagram illustrating the waveform adjustment screen W40 according to the fifth embodiment. The waveform adjustment screen W40 includes the waveform determination area R41 and the discharge execution button B40. The discharge execution button B40 is the same as the discharge execution button B20 in the first embodiment.

The waveform determination area R41 is the same as the waveform determination area R21 in the first embodiment except the following components. In an image G41 in the waveform determination area R41, the drive waveform determined automatically is displayed. In this regard, the features of the image G41 other than this are the same as those of the image G21 in the first embodiment. Also, in the combo box group B41 of the waveform determination area R41, the state value of the drive pulse PD having the drive waveform determined automatically is displayed. In this regard, the features of the combo box group B41 other than this are the same as those of the combo box group B21 in the first embodiment. Since the drive waveform and the state value that are automatically determined are displayed in the waveform determination area R41, compared with the case of displaying an initial waveform, it is possible for the user to easily set the state value.

In step S28, the input reception section 442 receives a user instruction. After the input reception section 442 receives the user operation on the combo box group B41, the input reception section 442 receives a user operation on the discharge execution button B40. In response to the user operation, the waveform determination section 446 generates a drive waveform designed by the user as the tentatively determined drive waveform. Returning back to step S19, the notification section 441 notifies the user of the discharge result based on the drive waveform. Specifically, the notification section 441 causes the display device 410 to display the determination result display screen W35D in FIG. 22 indicating the discharge result, and the like.

Also, when a user operation on the discharge determination button B351 is received in step S23, the determination section 443 determines that an adjustment instruction on the drive waveform has not been received. That is to say, the determination section 443 determines that the instruction on the seventh information D17 is negation, and an instruction on the fifth information D15 has been given. In this case, in step S20, the waveform determination section 446 finally determines the drive waveform newly determined by the second determination method as the waveform having the drive pulse PD to be applied for the actual printing by the liquid discharge apparatus 200. The memory circuit 430 stores the drive waveform as the discharge waveform information D34.

In this regard, in step S28, after the input reception section 442 receives a user instruction, the processing may proceed to step S20 without discharging ink again, and the drive waveform designed by the user may be finally determined as the waveform having the drive pulse PD to be applied in the liquid discharge apparatus 200 at the actual printing. In this case, the waveform adjustment screen W40 includes the waveform determination button (not illustrated in the figure) instead of the discharge execution button B40. The waveform determination button is a button to be selected when the user designs the drive waveform, and then determines to use the drive waveform.

As described above, after the drive waveform is determined by the second determination method, the adjustment button B353 indicating the seventh information D17 for the user to adjust the drive waveform is displayed. Accordingly, it is possible for the user to manually design a desirable drive waveform based on the drive waveform determined automatically. Also, by performing the operation on the discharge determination button B351, it is possible for the user to determine the adjusted drive waveform as the waveform of the drive pulse PD to be actually applied to the liquid discharge apparatus 200. Accordingly, it is effective when the drive waveform is slightly adjusted automatically.

With the fifth embodiment described above, it is possible to improve usability. In this regard, the determination result display screen W35D according to the present embodiment includes the discharge determination button B351 indicating the fifth information D15 and the adjustment button B353 indicating the seventh information D17. However, the determination result display screen W35D may include the redetermination button B352 indicating the sixth information D16 according to the fourth embodiment in addition to the discharge determination button B351 and the adjustment button B353. In this case, it is possible to select only one among the discharge determination button B351, the redetermination button B352, and the adjustment button B353.

Figure 24:
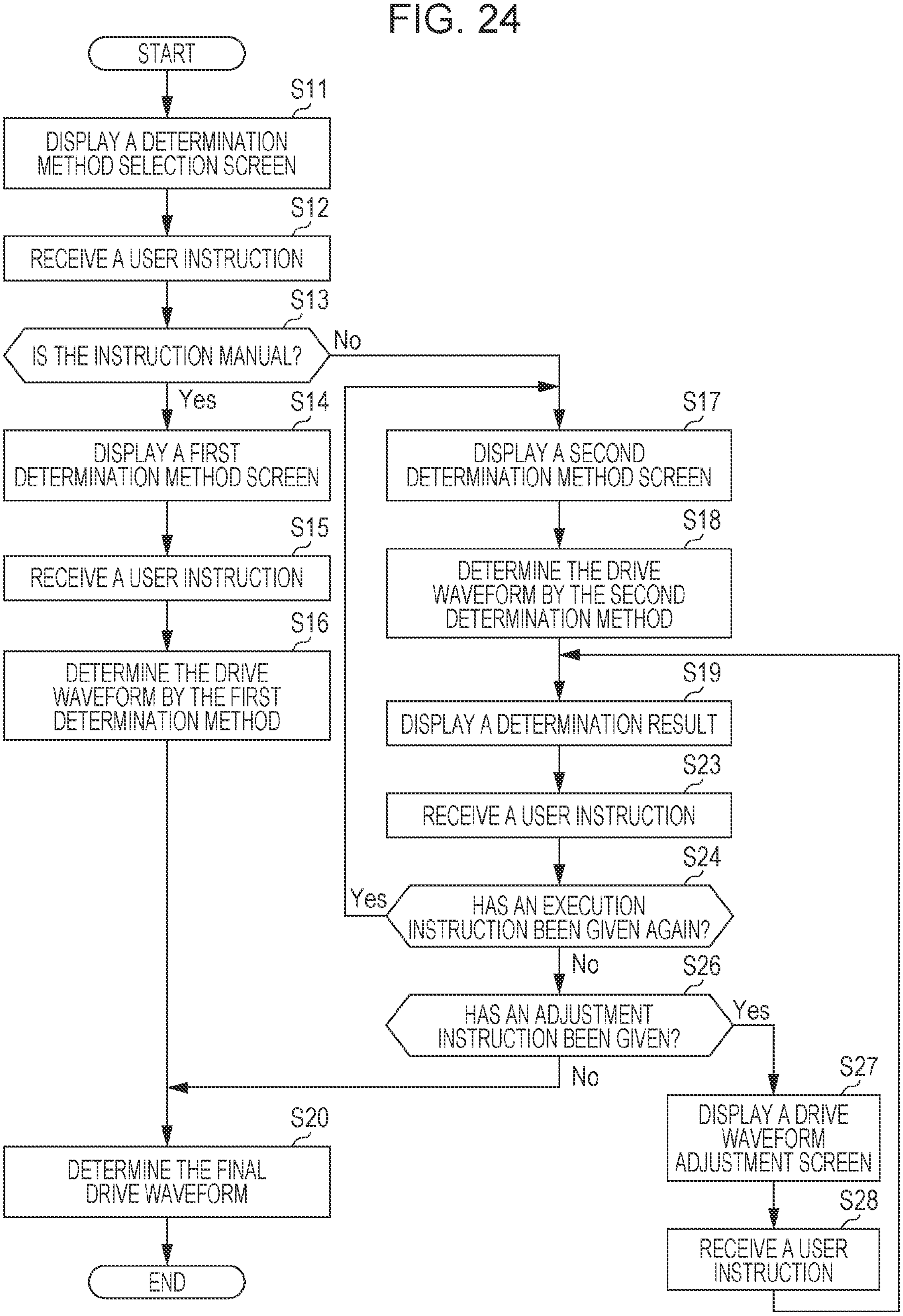
FIG. 24 is a flowchart illustrating a drive waveform determination method according to a variation of the fifth embodiment.
Figure 25:
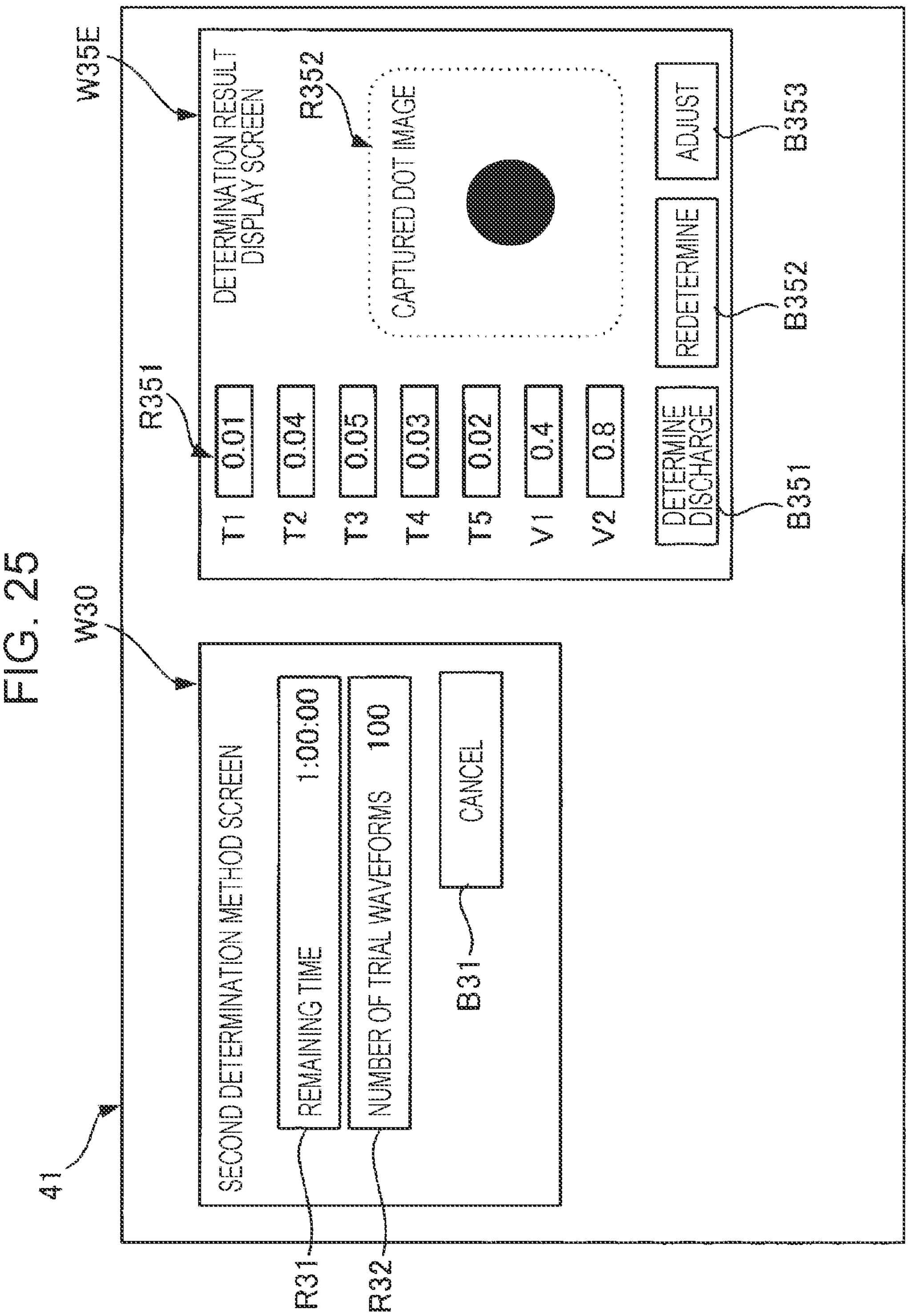
FIG. 25 is a diagram illustrating a variation of the determination result display screen according to the fifth embodiment.

FIG. 24 is a flowchart of a variation of the drive waveform determination method according to the fifth embodiment. FIG. 25 is a diagram illustrating the variation of the determination result display screen W35D according to the fifth embodiment. When the fifth information D15, the sixth information D16, and the seventh information D17 are notified, the drive waveform is determined in accordance with the flowchart illustrated in FIG. 24. Also, in this case, the determination result display screen W35D illustrated in FIG. 25 is displayed.

6. Sixth Embodiment

Figure 26:
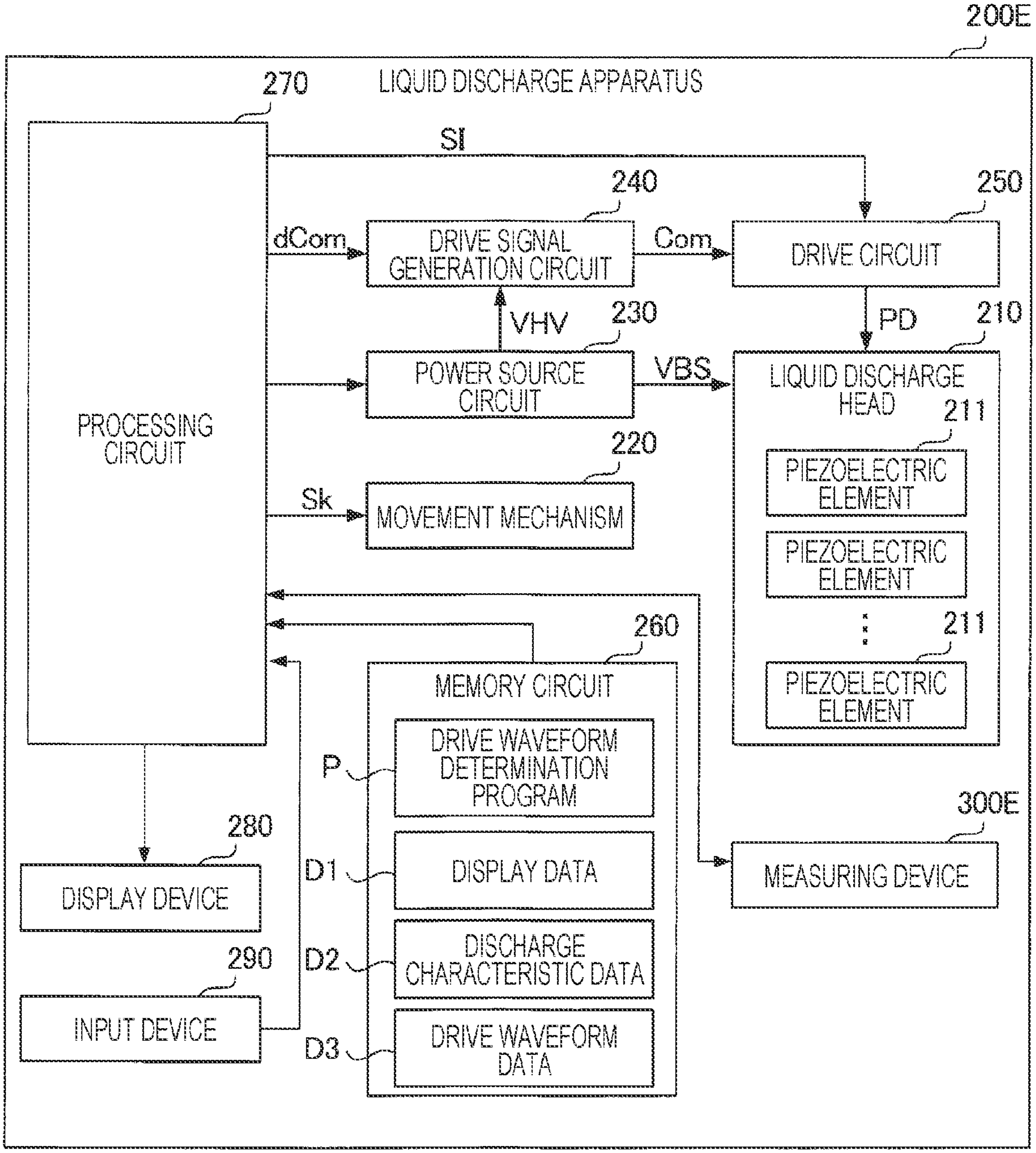
FIG. 26 is a schematic diagram illustrating an example of the configuration of a liquid discharge apparatus according to a sixth embodiment.

FIG. 26 is a schematic diagram illustrating an example of the configuration of a liquid discharge apparatus 200E according to the sixth embodiment. The liquid discharge apparatus 200E is the same as the liquid discharge apparatus 200 according to the first embodiment with the exception of including the display device 280, the input device 290, and the measuring device 300E and executing the drive waveform determination program P.

The display device 280 is configured in the same manner as the display device 410 according to the first embodiment. The input device 290 is configured in the same manner as the input device 420 according to the first embodiment. The measuring device 300E is configured in the same manner as the measuring device 300 according to the first embodiment. In this regard, at least one of the display device 280, the input device 290, and the measuring device 300E may be disposed outside the liquid discharge apparatus 200E.

The memory circuit 260 according to the present embodiment stores the drive waveform determination program P, the display data D1, the discharge characteristics data D2, and the drive waveform data D3.

The processing circuit 270 according to the present embodiment is an example of a computer. The processing circuit 270 executes the drive waveform determination program P so as to function as the above-described notification section 441, input reception section 442, determination section 443, discharge controller 444, discharge characteristics calculation section 445, and waveform determination section 446.

The processing circuit 270 performs the drive waveform method including the first step and the second step in the same manner as the processing circuit 440 according to the first embodiment. In step S11, which is the first step, the notification section 441 notifies the user of the first information D11 for determining to perform either the first determination method for determining the drive waveform based on a user operation or the second determination method for determining the drive waveform without the user operation. In the second step, the waveform determination section 446 determines the drive waveform in accordance with the user-determined first determination method or second determination method based on the instruction on the first information D11. Accordingly, it is possible for the user to select whether to determine the drive waveform manually or automatically. Thus, it is possible to improve usability.

With the fifth embodiment described above, it is possible to improve usability. In this regard, the memory circuit 260 may have the data stored in the memory circuit 430 of any one of the second to the fifth embodiments.

7. Variations

In the above, the description has been given of the drive waveform determination method according to the present disclosure, the drive waveform determination program, the liquid discharge apparatus, and the drive waveform determination system based on the embodiments illustrated in the figures. However, the present disclosure is not limited to these. Also, it is possible to replace the component of each section of the present disclosure by any component that performs the same function as the embodiments described above and to add any other components.

In the embodiments described above, the configuration is exemplified in which the drive waveform determination program P is executed by the processing circuit installed in the same apparatus as that including the memory circuit in which the program is installed. However, the present disclosure is not limited to this configuration, and the program may be executed by a processing circuit disposed in an apparatus different from that including the memory circuit in which the program is installed.

In the above, the descriptions have given of the present disclosure based on the embodiments illustrated in the figures. However, the present disclosure is not limited to these. Also, it is possible to replace the component of each section of the present disclosure by any component that performs the same function as that of the embodiments described above and to add any other components. Also, it may be possible to configure the present disclosure by combining any component of each of the embodiments described above.

What is claimed is:

1. A drive waveform determination method for determining a drive waveform being a waveform of a drive pulse to be applied to a drive element to discharge liquid from a liquid discharge head, the method comprising:

a first step of notifying a user of first information for the user to determine whether to use a first determination method of determining the drive waveform based on a user operation or a second determination method of determining the drive waveform without any user operation; and a second step of determining the drive waveform in accordance with the first determination method or the second determination method determined by the user based on an instruction on the first information, wherein in the first step, when determining a previous drive waveform, second information for the user to determine necessity of giving the instruction on determining either the first determination method or the second determination method at a time of determining a next drive waveform is further notified, when the instruction on the second information in the first step, when determining the previous drive waveform, is unnecessary, a third step for determining the drive waveform in accordance with the determination method when the previous drive waveform was determined is further included at a time of determining the next drive waveform, when the instruction on the first information is the first determination method in the second step, third information for determining the drive waveform by the user operation is notified, and the third information includes a discharge result area indicating an area, in which the discharge liquid is impacted.

2. The drive waveform determination method according to claim 1, wherein when the instruction on the second information is necessary in the first step at a time of determining the previous drive waveform, the first step and the second step are performed at a time of determining the next drive waveform.

3. The drive waveform determination method according to claim 1, wherein the third information includes at least information for setting a state value of a drive pulse, information for performing trial discharge by using the set state value, and information for evaluating a discharge result of the trial discharge.

4. The drive waveform determination method according to claim 1, wherein when the instruction on the first information is the second determination method, eighth information including at least one of information on a necessary time in the second determination method and information on a number of drive waveforms to be tried during performing the second determination method is further notified.

5. The drive waveform determination method according to claim 1, wherein in the first step, the notifying is performed by displaying the first information on a display section.

6. A non-transitory computer-readable storage medium storing a drive waveform determination program, the program causing a computer to perform the drive waveform determination method according to claim 1.

7. The drive waveform determination method according to claim 1, wherein an initial voltage and a difference between the highest and lowest voltages in the driving waveform are individually determined based on the instruction when the first determination method is determined.

8. The drive waveform determination method according to claim 1, wherein the driving waveform for each unit period includes a plurality of segments, and a period for each segment is individually determined based on the instruction.

9. A liquid discharge apparatus including a liquid discharge head including a drive element for discharging liquid and a processing circuit for performing processing for determining a waveform of a drive pulse to be applied to the drive element, the processing circuit configured to perform steps comprising:

a first step of notifying a user of first information for the user to determine whether to use a first determination method of determining the drive waveform based on a user operation or a second determination method of determining the drive waveform without any user operation; and a second step of determining the drive waveform in accordance with the first determination method or the second determination method determined by the user based on an instruction on the first information, wherein in the first step, when determining a previous drive waveform, second information for the user to determine necessity of giving the instruction on determining either the first determination method or the second determination method at a time of determining a next drive waveform is further notified, when the instruction on the second information in the first step, when determining the previous drive waveform, is unnecessary, a third step for determining the drive waveform in accordance with the determination method when the previous drive waveform was determined is further included at a time of determining the next drive waveform, when the instruction on the first information is the first determination method in the second step, third in formation for determining the rive waveform by the user operation is notified, and the third information includes a discharge result area indicating an area, in which the discharge liquid is impacted.

10. A drive waveform determination system including a liquid discharge apparatus including a liquid discharge head including a drive element for discharging liquid, and an information processing apparatus including a processing circuit for performing processing to determine a waveform of a drive pulse to be applied to the drive element, the processing circuit configured to perform steps comprising:

a first step of notifying a user of first information for the user to determine whether to use a first determination method of determining the drive waveform based on a user operation or a second determination method of determining the drive waveform without any user operation; and a second step of determining the drive waveform in accordance with the first determination method or the second determination method determined by the user based on an instruction on the first information, wherein in the first step, when determining a previous drive waveform, second information for the user to determine necessity of giving the instruction on determining either the first determination method or the second determination method at a time of determining a next drive waveform is further notified, when the instruction on the second information in the first step, when determining the previous drive waveform, is unnecessary, a third step for determining the drive waveform in accordance with the determination method when the previous drive waveform was determined is further included at a time of determining the next drive waveform, when the instruction on the first information is the first determination method in the second step, third information for determining the drive waveform by the user operation is notified, and the third information includes a discharge result area indicating an area, in which the discharge liquid is impacted.

* * * * *